(12) United States Patent
Bierdel et al.

(10) Patent No.: US 9,868,245 B2
(45) Date of Patent: Jan. 16, 2018

(54) SCREW ELEMENTS FOR EXTRUDING PLASTIC COMPOSITIONS

(75) Inventors: Michael Bierdel, Leverkusen (DE); Thomas König, Leverkusen (DE); Ulrich Liesenfelder, Bergisch Gladbach (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 1426 days.

(21) Appl. No.: 12/999,280

(22) PCT Filed: Jun. 12, 2009

(86) PCT No.: PCT/EP2009/004250
§ 371 (c)(1),
(2), (4) Date: Jan. 13, 2011

(87) PCT Pub. No.: WO2009/153002
PCT Pub. Date: Dec. 23, 2009

(65) Prior Publication Data
US 2011/0096617 A1     Apr. 28, 2011

(30) Foreign Application Priority Data
Jun. 20, 2008   (DE) .................. 10 2008 029 304

(51) Int. Cl.
*B29C 47/40*     (2006.01)
*B29B 7/48*      (2006.01)
(Continued)

(52) U.S. Cl.
CPC ............. *B29C 47/40* (2013.01); *B29B 7/483* (2013.01); *B29C 47/0844* (2013.01); *B29C 47/0854* (2013.01); *B29C 47/0861* (2013.01); *B29C 47/0881* (2013.01); *B29C 47/402* (2013.01); *B29C 47/6056* (2013.01); *B29C 47/627* (2013.01); *B29C 47/0009* (2013.01);
(Continued)

(58) Field of Classification Search
CPC ............ B29C 47/6043; B29C 47/6062; B29C 47/6056; B29C 47/40
USPC ............. 366/82, 85, 301; 425/204, 208, 209
See application file for complete search history.

(56) References Cited

U.S. PATENT DOCUMENTS 3,146,493 A * 9/1964 Steinle et al. ................... 425/6
3,254,367 A   6/1966 Erdmenger
(Continued)

FOREIGN PATENT DOCUMENTS

DE    1180718 B    11/1964
EP    0160124 A    11/1985
(Continued)

OTHER PUBLICATIONS

K. Schwarzenbach et al: Antioxidants, Zweifel, H. (ed.): Plastics Additives Handbook, Hanser, Munich, 2001.
(Continued)

*Primary Examiner* — Charles Cooley
*Assistant Examiner* — Marc C Howell
(74) *Attorney, Agent, or Firm* — K&L Gates LLP

(57) ABSTRACT

The invention relates to novel screw elements for multi-screw extruders with screw profiles co-rotating in pairs and being fully self-wiping in pairs, to the use of the screw elements in multi-screw extruders and to a process for extruding plastic compositions.

21 Claims, 15 Drawing Sheets

(51) Int. Cl.
*B29C 47/62* (2006.01)
*B29C 47/00* (2006.01)
*B29C 47/08* (2006.01)
*B29C 47/38* (2006.01)
*B29C 47/60* (2006.01)

(52) U.S. Cl.
CPC .......... *B29C 47/0825* (2013.01); *B29C 47/38* (2013.01); *B29C 47/60* (2013.01); *Y10T 29/49316* (2015.01)

(56) References Cited

U.S. PATENT DOCUMENTS

| | | | |
|---|---|---|---|
| 3,387,826 A * | 6/1968 | Loomans .......... | B01F 15/00435 366/100 |
| 3,608,868 A * | 9/1971 | Koch .................... | B29B 7/483 366/82 |
| 4,824,256 A | 4/1989 | Haring et al. | |
| 5,947,887 A * | 9/1999 | White et al. .................... | 588/11 |
| 6,116,770 A * | 9/2000 | Kiani et al. ..................... | 366/82 |
| 6,170,975 B1 * | 1/2001 | Andersen ......................... | 366/82 |
| 6,179,460 B1 * | 1/2001 | Burkhardt et al. ............. | 366/82 |
| 6,447,156 B2 * | 9/2002 | Maris ............................. | 366/82 |
| 6,783,270 B1 * | 8/2004 | Padmanabhan ................ | 366/82 |
| 6,974,620 B1 * | 12/2005 | Tsunekawa et al. ......... | 428/141 |
| 2002/0161137 A1 * | 10/2002 | Wilkinson .................... | 525/453 |
| 2004/0106703 A1 * | 6/2004 | Etzrodt et al. ............... | 523/330 |
| 2007/0209744 A1 * | 9/2007 | Matsumura .................. | 152/510 |
| 2007/0213418 A1 * | 9/2007 | Vermilion et al. .............. | 521/83 |
| 2007/0222105 A1 * | 9/2007 | Brown ................ | B29C 47/0019 264/211 |
| 2008/0004426 A1 * | 1/2008 | Brack et al. .................. | 528/503 |
| 2008/0033092 A1 * | 2/2008 | Santos et al. ................. | 524/445 |

FOREIGN PATENT DOCUMENTS

| | | |
|---|---|---|
| JP | 2004262177 | 9/2004 |
| WO | PCT/EP2009/003549 | 5/2009 |
| WO | 2009/152910 A1 | 12/2009 |

OTHER PUBLICATIONS

Cheng, H.N., Schilling, F.C., Bovey, F. A.: 13C Nuclear Magnetic Resonance Observation of the Oxidation of Polyethylene, Macromolecules 9 (1976, p. 363-365).

International Search Report dated Oct. 22, 2009.

Klemens Kohlgruber, et al., Co-Rotating Twin-Screw Extruders: Fundamentals, Technology, and Applications, Hanser Gardner Publications, Chapter 5.8, pp. 103-104 (2007).

Klemens Kohlgruber, et al., Co-Rotating Twin-Screw Extruders: Fundamentals, Technology, and Applications, Hanser Gardner Publications, Chapter 5.2, 92-94 (2007).

Klemens Kohlgruber, et al., Co-Rotating Twin-Screw Extruders: Fundamentals, Technology, and Applications, Hanser Gardner Publications, Chapter 12, 215-235 (2007).

* cited by examiner

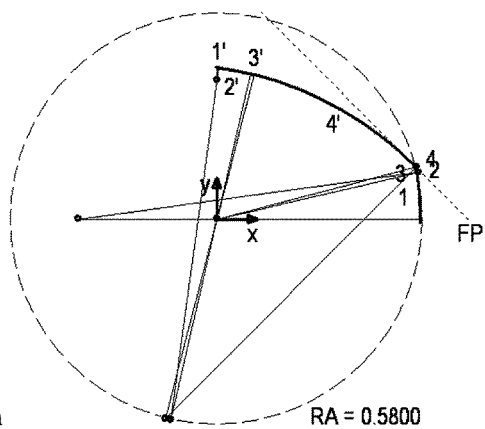
Figure 6a  RA = 0.5800
1) R = 0.9645  Mx = -0.3905
   α = 0.1357  My = 0.0000
2) R = 0.0000  Mx = 0.5651
   α = 0.0912  My = 0.1305
3) R = 0.5800  Mx = 0.0000
   α = 0.0270  My = 0.0000
4) R = 0.0000  Mx = 0.5614
   α = 0.5315  My = 0.1457
4') R = 1.0000  Mx = -0.1457
   α = 0.5315  My = -0.5614
3') R = 0.4200  Mx = 0.0000
   α = 0.0270  My = 0.0000
2') R = 1.0000  Mx = -0.1305
   α = 0.0912  My = -0.5651
1') R = 0.0355  Mx = 0.0000
   α = 0.1357  My = 0.3905
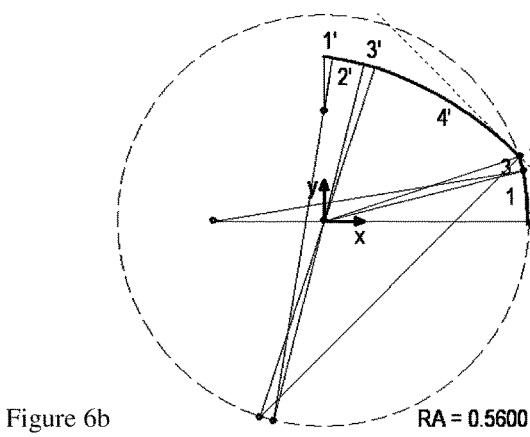
Figure 6b  RA = 0.5600
1) R = 0.8526  Mx = -0.2986
   α = 0.1622  My = 0.0000
2) R = 0.0000  Mx = 0.5428
   α = 0.0862  My = 0.1377
3) R = 0.5600  Mx = 0.0000
   α = 0.0698  My = 0.0000
4) R = 0.0000  Mx = 0.5319
   α = 0.4671  My = 0.1752
4') R = 1.0000  Mx = -0.1752
   α = 0.4671  My = -0.5319
3') R = 0.4400  Mx = 0.0000
   α = 0.0698  My = 0.0000
2') R = 1.0000  Mx = -0.1377
   α = 0.0862  My = -0.5428
1') R = 0.1474  Mx = 0.0000
   α = 0.1622  My = 0.2986
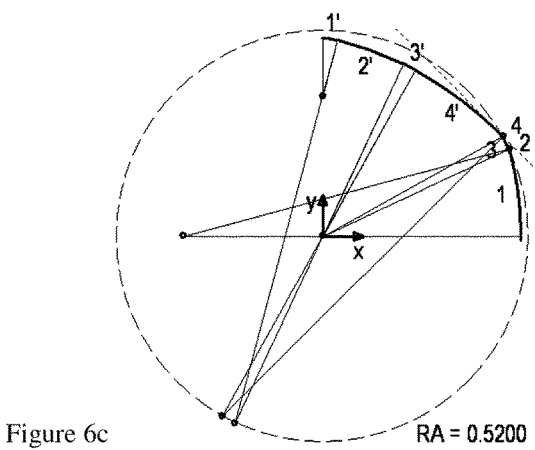
Figure 6c  RA = 0.5200
1) R = 0.8525  Mx = -0.3525
   α = 0.2613  My = 0.0000
2) R = 0.0000  Mx = 0.4711
   α = 0.1760  My = 0.2202
3) R = 0.5200  Mx = 0.0000
   α = 0.0698  My = 0.0000
4) R = 0.0000  Mx = 0.4545
   α = 0.2782  My = 0.2526
4') R = 1.0000  Mx = -0.2526
   α = 0.2782  My = -0.4545
3') R = 0.4800  Mx = 0.0000
   α = 0.0698  My = 0.0000
2') R = 1.0000  Mx = -0.2202
   α = 0.1760  My = -0.4711
1') R = 0.1475  Mx = 0.0000
   α = 0.2613  My = 0.3525

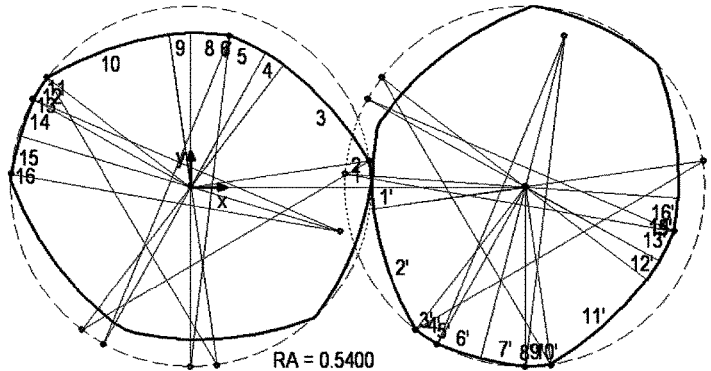

RA = 0.5400

| | | | |
|---|---|---|---|
| 1) R = 0.5400 Mx = 0.0000<br>α = 0.1450 My = 0.0000 | 1') R = 0.4600 Mx = 1.0000<br>α = 0.1450 My = -0.0000 | 17) R = 0.5400 Mx = 0.0000<br>α = 0.0419 My = 0.0000 | 17') R = 0.4600 Mx = 1.0000<br>α = 0.0419 My = 0.0000 |
| 2) R = 0.0000 Mx = 0.5343<br>α = 0.3873 My = 0.0780 | 2') R = 1.0000 Mx = 1.5343<br>α = 0.3873 My = 0.0780 | 18) R = 0.0000 Mx = -0.5398<br>α = 0.3873 My = 0.0159 | 18') R = 1.0000 Mx = 0.4602<br>α = 0.3873 My = 0.0159 |
| 3) R = 1.0000 Mx = -0.3273<br>α = 0.3873 My = -0.4295 | 3') R = 0.0000 Mx = 0.6727<br>α = 0.3873 My = -0.4295 | 19) R = 1.0000 Mx = 0.3969<br>α = 0.3873 My = 0.3661 | 19') R = 0.0000 Mx = 1.3969<br>α = 0.3873 My = 0.3661 |
| 4) R = 0.4600 Mx = 0.0000<br>α = 0.1450 My = 0.0000 | 4') R = 0.5400 Mx = 1.0000<br>α = 0.1450 My = 0.0000 | 20) R = 0.4600 Mx = 0.0000<br>α = 0.0419 My = 0.0000 | 20') R = 0.5400 Mx = 1.0000<br>α = 0.0419 My = 0.0000 |
| 5) R = 1.0000 Mx = -0.2618<br>α = 0.1172 My = -0.4723 | 5') R = 0.0000 Mx = 0.7382<br>α = 0.1172 My = -0.4723 | 21) R = 1.0000 Mx = 0.3812<br>α = 0.1247 My = 0.3824 | 21') R = 0.0000 Mx = 1.3812<br>α = 0.1247 My = 0.3824 |
| 6) R = 0.0019 Mx = 0.1167<br>α = 0.1359 My = 0.4512 | 6') R = 0.9981 Mx = 1.1167<br>α = 0.1359 My = 0.4512 | 22) R = 0.1794 Mx = -0.1213<br>α = 0.2316 My = -0.2663 | 22') R = 0.8206 Mx = 0.8787<br>α = 0.2316 My = -0.2663 |
| 7) R = 0.0019 Mx = 0.1167<br>α = 0.1359 My = 0.4512 | 7') R = 0.9981 Mx = 1.1167<br>α = 0.1359 My = 0.4512 | 23) R = 0.1794 Mx = -0.1213<br>α = 0.2316 My = -0.2663 | 23') R = 0.8206 Mx = 0.8787<br>α = 0.2316 My = -0.2663 |
| 8) R = 1.0000 Mx = 0.0000<br>α = 0.1172 My = -0.5400 | 8') R = 0.0000 Mx = 1.0000<br>α = 0.1172 My = -0.5400 | 24) R = 1.0000 Mx = 0.0385<br>α = 0.1247 My = 0.5386 | 24') R = 0.0000 Mx = 1.0385<br>α = 0.1247 My = 0.5386 |
| 9) R = 0.4600 Mx = 0.0000<br>α = 0.1450 My = 0.0000 | 9') R = 0.5400 Mx = 1.0000<br>α = 0.1450 My = 0.0000 | 25) R = 0.4600 Mx = 0.0000<br>α = 0.0419 My = 0.0000 | 25') R = 0.5400 Mx = 1.0000<br>α = 0.0419 My = 0.0000 |
| 10) R = 1.0000 Mx = 0.0780<br>α = 0.3873 My = -0.5343 | 10') R = 0.0000 Mx = 1.0780<br>α = 0.3873 My = -0.5343 | 26) R = 1.0000 Mx = 0.0159<br>α = 0.3873 My = 0.5398 | 26') R = 0.0000 Mx = 1.0159<br>α = 0.3873 My = 0.5398 |
| 11) R = 0.0000 Mx = -0.4295<br>α = 0.3873 My = 0.3273 | 11') R = 1.0000 Mx = 0.5705<br>α = 0.3873 My = 0.3273 | 27) R = 0.0000 Mx = 0.3661<br>α = 0.3873 My = -0.3969 | 27') R = 1.0000 Mx = 1.3661<br>α = 0.3873 My = -0.3969 |
| 12) R = 0.5400 Mx = 0.0000<br>α = 0.1450 My = 0.0000 | 12') R = 0.4600 Mx = 1.0000<br>α = 0.1450 My = -0.0000 | 28) R = 0.5400 Mx = 0.0000<br>α = 0.0419 My = 0.0000 | 28') R = 0.4600 Mx = 1.0000<br>α = 0.0419 My = 0.0000 |
| 13) R = 0.0000 Mx = -0.4723<br>α = 0.1007 My = 0.2618 | 13') R = 1.0000 Mx = 0.5277<br>α = 0.1007 My = 0.2618 | 29) R = 0.0000 Mx = 0.3824<br>α = 0.1607 My = -0.3812 | 29') R = 1.0000 Mx = 1.3824<br>α = 0.1607 My = -0.3812 |
| 14) R = 1.0000 Mx = 0.4466<br>α = 0.1167 My = -0.1327 | 14') R = 0.0000 Mx = 1.4466<br>α = 0.1167 My = -0.1327 | 30) R = 0.9000 Mx = -0.3484<br>α = 0.2312 My = 0.1440 | 30') R = 0.1000 Mx = 0.6516<br>α = 0.2312 My = 0.1440 |
| 15) R = 1.0000 Mx = 0.4466<br>α = 0.1167 My = -0.1327 | 15') R = 0.0000 Mx = 1.4466<br>α = 0.1167 My = -0.1327 | 31) R = 0.9000 Mx = -0.3484<br>α = 0.2312 My = 0.1440 | 31') R = 0.1000 Mx = 0.6516<br>α = 0.2312 My = 0.1440 |
| 16) R = 0.0000 Mx = -0.5386<br>α = 0.1007 My = 0.0385 | 16') R = 1.0000 Mx = 0.4614<br>α = 0.1007 My = 0.0385 | 32) R = 0.0000 Mx = 0.5400<br>α = 0.1607 My = 0.0000 | 32') R = 1.0000 Mx = 1.5400<br>α = 0.1607 My = 0.0000 |

Figure 7

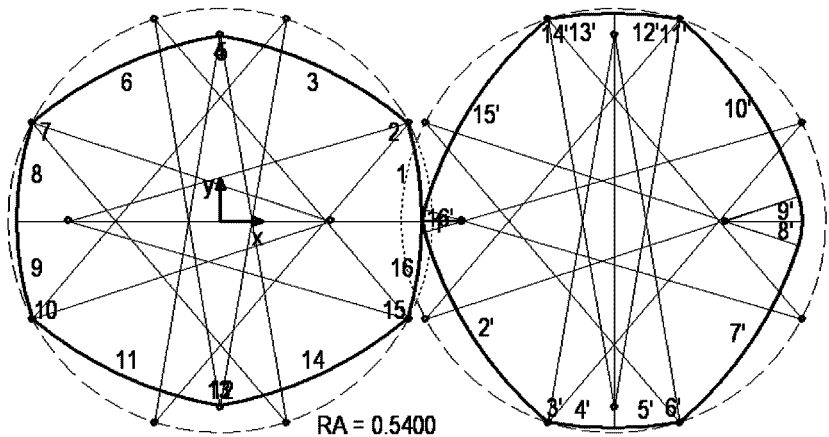

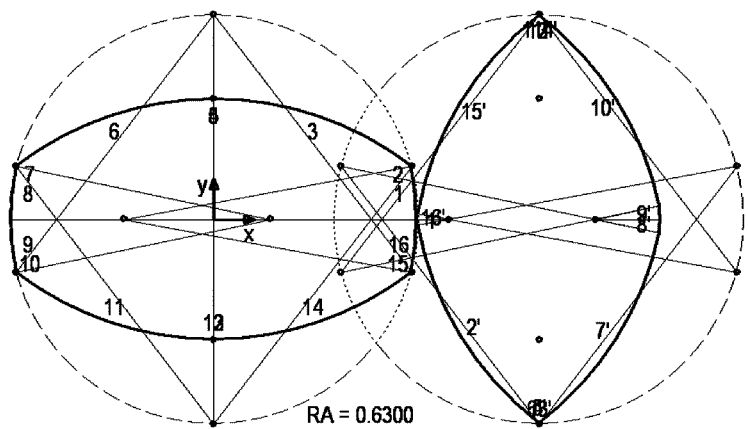

SCREW ELEMENTS FOR EXTRUDING PLASTIC COMPOSITIONS

This is an application filed under 35 USC § 371 of PCT/EP2009/004250, claiming priority to DE 10 2008 029 304.0 filed on Jun. 20, 2008.

BACKGROUND OF THE INVENTION

(1) Field of the Invention

The invention relates to novel screw elements for multi-screw extruders with screw profiles co-rotating in pairs and fully self-wiping in pairs, to the use of the screw elements in multi-screw extruders and to a process for extruding plastic compositions.

(2) Description of Related Art

Co-rotating twin- or optionally multi-screw extruders, the rotors of which are fully self-wiping, have long been known. A comprehensive overview of such screw extruders is to be found in the following publication of Kohlgrüber: Der gleichläufige Doppelschneckenextruder (The co-rotating twin-screw extruder), Hanser Verlag, Munich, 2007.

Extruders which are based on the principle of fully self-wiping profiles have been put to many different uses in polymer production and polymer processing. This is primarily a consequence of the fact that polymer melts adhere to surfaces and degrade over time at conventional processing temperatures, which is prevented by the self-cleaning action of fully self-wiping screws. Rules for producing fully self-wiping screw profiles are given for example in the publication by Kohlgrüber on pages 96-109. It is also described therein how a predetermined screw profile of the 1st screw of a twin-screw extruder determines the screw profile of the 2nd screw of a twin-screw extruder. The screw profile of the 1st screw of the twin-screw extruder is therefore known as the generating screw profile. The screw profile of the 2nd screw of the twin-screw extruder follows from the screw profile of the 1st screw of the twin-screw extruder and is therefore known as the generated screw profile. In the case of a multi-screw extruder, neighbouring screws are always arranged alternately with a generating screw profile and a generated screw profile.

Modern twin-screw extruders have a building-block system, in which various screw elements may be mounted on a core shaft. In this way, a person skilled in the art may adapt the twin-screw extruder to the particular task in hand. A pair of screw elements consists of one screw element with a generating screw profile and one screw element with a generated screw profile.

As may be found for example in Kohlgrüber on pages 96-109, the known Erdmenger screw profile, named after its principal inventor, is clearly defined by stating the three variables: number of flights z, outer screw radius ra and centreline distance a. The number of flights z is an integer, which is greater than or equal to 1. A further important characteristic parameter of a screw profile is the core radius ri. A further important characteristic parameter of a screw profile is the flight depth h.

The zones of a screw profile which are equal to the outer screw radius are known as tip zones. The angle between the starting and end points of a tip zone relative to the point of rotation of the screw profile is known as the tip angle. A tip zone which contacts the outer screw radius at just one point has the tip angle 0, the starting and end points coinciding at one point. The zones of a screw profile which are equal to the core radius are known as grooved zones. The angle between the starting and end points of a grooved zone relative to the point of rotation of the screw profile is known as the groove angle. A grooved zone which contacts the core radius at just one point has the groove angle 0, the starting and end points being identical here too. The zones of a screw profile which are smaller than the outer screw radius and larger than the core radius are known as flank zones. Accordingly, the angle between the starting and end points of a flank zone relative to the point of rotation of the screw profile is known as the flank angle. The zone of a multi-screw extruder at which two barrel bores interpenetrate is known as the intermesh zone. The two points of intersection of two barrel bores are known as barrel intermeshes.

The tip angle $\delta\_kw$ of an Erdmenger screw profile with z flights is calculated as $\delta\_kw = \pi/z - 2*\arccos(0.5*a/ra)$, $\pi (\pi \approx 3.14159)$ being the circle constant Kohlgrüber. The sum of the tip angles of a pair of double-flighted screw elements with an Erdmenger screw profile is thus equal to $2*\pi - 8*\arccos(0.5*a/ra)$.

In addition, Kohlgrüber explains in detail the structure, function and operation of twin- and multi-screw extruders. A whole chapter (pages 227-248) is devoted to the screw elements and their mode of action. Here the structure and function of conveying, kneading and mixing elements is explained in detail. To enable a transition between screw elements with different numbers of flights, washers are often used as spacers. In special cases, "transition elements" are used, which enable a continuous transition between two screw profiles with different numbers of flights, a self-cleaning pair of screw profiles being provided at each point of the transition.

A plastic composition is taken to mean a deformable composition. Examples of plastic compositions are polymer melts, especially of thermoplastics and elastomers, mixtures of polymer melts or dispersions of polymer melts with solids, liquids or gases.

The extrusion of plastic compositions plays a major role in particular in the production, compounding and processing of polymers. Extrusion is taken to mean the treatment of a substance or mixture of substances in a co-rotating twin- or multi-screw extruder, as is comprehensively described in Kohlgrüber.

During polymer production, extrusion is performed, for example, to degas the polymers (see for example Kohlgrüber, pages 191 to 212).

During polymer compounding, extrusion is performed, for example, to incorporate additives or to mix various polymers which differ, for example, in chemical composition, molecular weight or molecular structure (see for example Kohlgrüber, pages 59 to 93). Compounding involves the conversion of a polymer into a finished plastics moulding composition (or compound) using plastics raw materials, which are conventionally melted, and adding and incorporating fillers and/or reinforcing materials, plasticizers, bonding agents, slip agents, stabilizers, colours etc. Compounding often also includes the removal of volatile constituents such as for example air and water. Compounding may also involve a chemical reaction such as for example grafting, modification of functional groups or molecular weight modifications by deliberately increasing or decreasing molecular weight.

During polymer processing, the polymers are preferably converted into the form of a semi-finished product, a ready-to-use product or a component. Processing may proceed, for example, by injection moulding, extrusion, film blowing, calendering or spinning Processing may also involve mixing polymers with fillers and auxiliary substances and additives as well as chemical modifications such as for example vulcanization.

The treatment of plastic compositions during extrusion includes one or more of the operations: conveying, melting, dispersion, mixing, degassing and pressure build-up.

As is generally known and described, for example, in Kohlgrüber on pages 169 to 190, mixing may be differentiated into distributive and dispersive mixing. Distributive mixing is taken to mean the uniform distribution of various components in a given volume. Distributive mixing occurs, for example, when similar polymers are mixed. In dispersive mixing, solid particles, fluid droplets or gas bubbles are firstly subdivided. Subdivision entails applying sufficiently large shear forces in order, for example, to overcome the surface tension at the interface between the polymer melt and an additive. Mixing is always understood below to mean distributive and/or dispersive mixing.

Melt conveying and pressure build-up are described on pages 73 et seq. of publication Kohlgrüber. The melt conveying zones in extruder screws serve to transport the product from one processing zone to the next and to draw in fillers. Melt conveying zones are generally partially filled, such as for example during the transport of the product from one processing zone to the next, during degassing and in holding zones. The energy required for conveying is dissipated and is disadvantageously manifested by an increase in the temperature of the polymer melt. The screw elements used in a conveying zone should therefore be those which dissipate the least possible energy. Thread elements having pitches of 1× the internal extruder diameter D are conventional for simple melt conveying Kohlgrüber.

Upstream of pressure consumers within the extruder, such as for example backward conveying elements, mixing elements, backward conveying or neutral kneading blocks, and upstream of pressure consumers outside the extruder, such as for example die plates, extrusion dies and melt filters there is formed a back pressure zone within the extruder, in which conveying is carried out in a completely full state and in which the pressure for overcoming the pressure consumer must be built up. The pressure build-up zone of an extruder, in which the pressure required to output the melt is generated, is known as the metering zone. The energy introduced into the polymer melt is divided into effective power for pressure build-up and for conveying the melt and dissipation power which is disadvantageously manifested by an increase in the temperature of the melt. In the pressure build-up zone, strong reflux of the melt occurs over the screw tips, so resulting in elevated energy input Kohlgrüber. The screw elements used in a pressure build-up zone should therefore be those which dissipate the least possible energy.

It is known to a person skilled in the art that in the region of the screw tips a particularly large amount of energy is dissipated in the melt, which leads locally to severe overheating in the product. This is explained for example in Kohlgrüber on pages 160 et seq. for a double-flighted conveying element with the known Erdmenger screw profile. This local overheating may result in harm to the product such as for example a change in odour, colour, chemical composition or molecular weight or in the formation of non-uniformities in the product such as gel particles or specks. A large tip angle, in particular, is harmful in this respect. Furthermore, in many processes a high energy input also limits the possible throughput of the twin-screw extruder and thus its economic viability.

A person skilled in the art furthermore knows (Kohlgrüber, pages 129 to 146) that efficiency during pressure build-up of double-flighted conveying elements with the known Erdmenger screw profile is around 10%. A pressure rise of 50 bar at a melt density of 1000 kg/m$^3$ and a thermal capacity of the melt of 2000 J/kg/K results at said efficiency of 10% in a temperature rise of 25 K (Kohlgrüber, page 120). This heating may result in harm to the product such as for example a change in odour, colour, chemical composition or molecular weight or in the formation of non-uniformities in the product such as gel particles or specks.

When extruding polyethylene and polyethylene copolymers, an excessively high temperature results in an increase in molecular weight, branching and crosslinking. Polyethylene and polyethylene copolymers furthermore react with atmospheric oxygen in the autoxidation cycle known to a person skilled in the art (Hepperle, J.: Schädigungsmechanismen bei Polymeren [Damage mechanisms in polymers], Polymeraufbereitung 2002, VDI-K, VDI-Verlag GmbH, Zweifel, H.: Stabilization of Polymeric Materials, Springer, Berlin, 1997, Schwarzenbach, K. et al.: Antioxidants, in Zweifel, H. (ed.): Plastics Additives Handbook, Hanser, Munich, 2001, Cheng, H. N., Schilling, F. C., Bovey, F. A.: $^{13}$C Nuclear Magnetic Resonance Observation of the Oxidation of Polyethylene, Macromolecules 9 (1976) p. 363-365) to form strong-smelling and thus disruptive low molecular weight components such as for example ketones, aldehydes, carboxylic acids, hydroperoxides, esters, lactones and alcohols.

When extruding copolymers based on polyethylene and vinyl acetate, an excessively high temperature additionally results in the formation of strong-smelling and corrosive acetic acid.

When extruding polypropylene and polypropylene copolymers, an excessively high temperature results in molecular weight degradation. Polypropylene and polypropylene copolymers furthermore react with atmospheric oxygen in the autoxidation cycle to form strong-smelling and thus disruptive low molecular weight components such as for example ketones, aldehydes, carboxylic acids, hydroperoxides, esters, lactones and alcohols.

When extruding polyvinyl chloride, an excessively high temperature results in product discoloration and the elimination of corrosive gaseous hydrochloric acid, wherein the hydrochloric acid in turn catalyses further elimination of hydrochloric acid.

When extruding polystyrene, an excessively high temperature results in the formation of harmful styrene as well as dimeric and trimeric styrene, with molecular weight degradation and corresponding impairment of mechanical properties.

When extruding polystyrene-acrylonitrile copolymer (SAN), the product turns a yellowish colour on exposure to thermal stress, resulting in reduced transparency, and forms the carcinogenic monomer acrylonitrile as well as styrene, with molecular weight degradation and impairment of mechanical properties.

When extruding aromatic polycarbonates, the product turns a yellowish colour on exposure to excessive thermal stress, in particular due to the action of oxygen, resulting in reduced transparency, and exhibits molecular weight degradation, in particular due to the action of water. Monomers such as for example bisphenol A are also dissociated on exposure to elevated temperature.

When extruding polyesters such as for example polyethylene terephthalate, polybutylene terephthalate and polytrimethylene terephthalate, an excessive temperature and the action of water result in a reduction in molecular weight and displacement of the end groups in the molecule. This is problematic especially when recycling polyethylene terephthalate. Polyethylene terephthalate eliminates acetaldehyde at elevated temperature, which may for example result in changes to the flavour of the contents of beverage bottles.

When extruding thermoplastics impact-modified with diene rubbers, in particular with butadiene rubber, in particular impact-modified grades of polystyrene (HIPS) and impact-modified SAN (acrylonitrile-butadiene-styrene, ABS), an excessive temperature results in the elimination of carcinogenic butadiene and toxic vinylcyclohexene. Furthermore the diene rubber crosslinks, resulting in impaired mechanical properties of the product.

When extruding polyoxymethylene, an excessive temperature results in the elimination of toxic formaldehyde.

When extruding polyamides such as polyamide 6, polyamide 6,6, polyamide 4,6, polyamide 11 and polyamide 12, an excessively high temperature results in product discoloration and molecular weight degradation and in the reformation of monomers and dimers, so resulting in impairment of mechanical properties, especially in the presence of water.

When extruding thermoplastic polyurethanes, an excessively high temperature results in changes to the molecular structure by transurethanization and, in the presence of water, in molecular weight degradation. Both of these undesirably influence the properties of the thermoplastic polyurethane.

When extruding polymethyl methacrylate, methyl methacrylate is eliminated and molecular weight degraded on exposure to excessive thermal stress, resulting in an odour nuisance and impaired mechanical properties.

When extruding polyphenylene sulfide, an excessively high temperature results in the elimination of sulphur-containing organic and inorganic compounds, which result in an odour nuisance and may lead to corrosion of the extrusion dies. Low molecular weight oligomers and monomers are also formed and the molecular weight degraded, so impairing the mechanical properties of polyphenylene sulfide.

When extruding polyphenylsulfone, an excessively high temperature results in the elimination of organic compounds, especially in the presence of water. The molecular weight also declines, resulting in impaired mechanical properties.

When extruding polyphenylene ether, excessively high temperatures result in the elimination of low molecular weight organic compounds, wherein the molecular weight declines. This results in impairment of the mechanical properties of the product.

When extruding diene rubbers such as for example polybutadiene (BR), natural rubber (NR) and synthetic polyisoprene (IR), butyl rubber (IIR), chlorobutyl rubber (CIIR), bromobutyl rubber (BIIR), styrene-butadiene rubber (SBR), polychloroprene (CR), butadiene-acrylonitrile rubber (NBR), partially hydrogenated butadiene-acrylonitrile rubber (HNBR) and ethylene-propylene-diene copolymers (EPDM), an excessively high temperature results in gel formation by crosslinking, which leads to the impairment of mechanical properties of components produced therefrom. In the case of chloro- and bromobutyl rubber, an elevated temperature may result in the elimination of corrosive gaseous hydrochloric or hydrobromic acid, which in turn catalyses further decomposition of the polymer.

When extruding rubber compounds which contain vulcanizing agents, such as for example sulphur or peroxides, excessively high temperatures result in premature vulcanization. This results in its no longer being possible to produce any products from these rubber compounds.

When extruding mixtures of one or more polymers at excessively high temperatures, the disadvantages of extruding the individual polymers occur in each case.

On the basis of the prior art, the object is therefore to provide screw elements for multi-screw extruders which simultaneously display the highest possible efficiency during pressure build-up and the lowest possible exposure of the product to thermal stress.

Novel screw elements have surprisingly been found which exhibit reduced tip angles relative to the prior art and which simultaneously result in the highest possible efficiency during pressure build-up and the lowest possible exposure of the product to thermal stress.

BRIEF SUMMARY OF THE INVENTION

The present invention therefore provides screw elements for multi-screw extruders, characterized in that
the sum of all the tip angles of a pair of screw elements is greater than or equal to 0 and less than $2*\pi-8*\arccos(0.5*a/ra)$,
the number of tip zones of a pair of screw elements is greater than 4,
each screw element of a pair of screw elements comprises two screw profile zones, which consist in each case of flank zones and grooved zones and in which the sum of the flank and groove angles is in each case greater than $\pi/2$.

As has already been explained above, the sum of the tip angles of a pair of double-flighted screw elements with an Erdmenger screw profile is thus equal to $2*\pi-8*\arccos(0.5*a/ra)$. The screw elements according to the invention comprise a zone of reduced length relative to screw elements with a double-flighted Erdmenger screw profile, which zone corresponds to the outer screw radius and in which a particularly large amount of energy is known to be introduced into the extrusion material. In this way, energy input is effectively reduced and the risk of product damage reduced.

The sum of all the tip angles of a pair of screw elements according to the invention is less than $2*\pi-8*\arccos(0.5*a/ra)$, preferably less than $0.8*(2*\pi-8*\arccos(0.5*a/ra))$, particularly preferably less than $0.6*(2*\pi-8*\arccos(0.5*a/ra))$ and most preferably less than $0.4*(2*\pi-8*\arccos(0.5*a/ra))$.

Furthermore, the sum of the tip zones amounts, in the case of a pair of double-flighted screw elements with an Erdmenger screw profile, to 4. The number of tip zones of a pair of screw elements according to the invention is greater than 4, preferably equal to 5 or 6 and particularly preferably equal to 8. The number of tip zones of an individual screw element of a pair of screw elements according to the invention is preferably equal to 2 or 3 and particularly preferably equal to 4.

According to the invention, each screw element of a pair of screw elements comprises two screw profile zones, which consist in each case of flank zones and grooved zones and in which the sum of the flank and groove angles is in each case greater than $\pi/2$. These two screw profile zones may also be known as channel zones. Virtually all the extrusion material is located in these channel zones.

The sum of the angles of a screw profile zone, which consists of flank zones and grooved zones, is preferably greater than $2*\pi/3$.

In screw elements according to the invention, the generating screw profile may individually configured. In particular, the edges which define the tip zones may be rounded.

Screw elements according to the invention are preferably characterized in that one or more tip zones have a tip angle of 0. In such a case, cleaning of the barrel and cleaning of the grooved zone of the adjacent screw element proceeds with a tip zone which is reduced to a minimum. In this way, energy input and exposure of the extrusion material to stress are also reduced to a minimum. Sealing is punctiform and sufficient to ensure the necessary pressure build-up.

Screw elements according to the invention are preferably characterized in that, after a rotation of π/2, the generated screw profile is identical to the generating screw profile. This has the advantage that no different screw elements have to be manufactured for neighbouring screws.

Preferred screw elements are those which have an identical screw profile for all the screws of a multi-screw extruder or the two screws of a twin-screw extruder.

It has surprisingly been found that screw profiles of a pair of screw elements according to the invention may be generated by a defined sequence of tip zones, flank zones and grooved zones. Screw elements according to the invention are characterized in that a generating and a generated screw profile display a sequence of channel zone-closing zone-channel zone-closing zone. Channel zone is understood to mean a sequence of flank zones and grooved zones. A channel zone is preferably a sequence of flank zone-grooved zone-flank zone-grooved zone-flank zone, particularly preferably a sequence of flank zone-grooved zone-flank zone.

The closing zone is either a tip zone or a sequence of tip and flank zones. A closing zone is preferably a sequence of tip zone-flank zone-tip zone.

A screw profile of a screw element according to the invention may clearly be obtained in that, starting for example with a double-flighted Erdmenger screw profile, a zone is "removed" from the tip zone of the double-flighted Erdmenger screw profile. In this way, the length of the tip zone is reduced and instead of one continuous tip zone two tip zones are obtained, between which a "gap" then arises. To ensure self-cleaning, a zone has then to be "added" again in the grooved zone of the initial double-flighted Erdmenger screw profile. Because, in the case of screw elements according to the invention, in each case two screw profile zones arise, which consist in each case of flank zones and grooved zones and in which the sum of the flank and groove angles is in each case greater than π/2, preferably greater than 2*π/3, it is ensured that the majority of the extrusion material is still located in two zones, the channel zones, and no appreciable additional flights arise as a result of the "gaps" in the original tip zones of a double-flighted Erdmenger screw profile.

In a preferred embodiment, "removal" proceeds in the tip zone and "addition" in the grooved zone, in such a way that a screw profile is obtained which is symmetrical relative both to the x axis and to the y axis. For full definition of such a symmetrical screw profile, only a first quarter of this screw profile has to be known, since the remainder of the screw profile may be obtained by mirroring at the axes.

It has surprisingly been found that further screw profiles of a screw element according to the invention may be obtained on the basis of a quarter of a screw profile of screw elements according to the invention.

The starting point is a quarter of a screw profile, which is placed in the 1st quadrant of an xy system of coordinates, and by mirroring this at the x and y axes a screw profile of screw elements according to the invention is obtained. By mirroring the flank zones and grooved zones of the stated quarter at the y axis, a first channel zone is obtained, which consists of flank zones and grooved zones. By mirroring this first channel zone at the x axis, a second channel zone is obtained, which consists of flank zones and grooved zones. The zones between the two channel zones are completed by a tip zone or by a sequence of tip and flank zones, preferably by a sequence of tip zone-flank zone-tip zone, in such a way that a continuous screw profile is obtained. Such zones are also known as closing zones. The angle between the starting and end points of a closing zone relative to the point of rotation of the screw profile is known as the closing angle.

In a preferred embodiment, a second channel zone is obtained by rotation of the first channel zone by an angle in the range from π to π−[π/2−2*arccos(0.5*a/ra)] clockwise or counterclockwise about the point of rotation of the screw profile. The term in the square brackets is equal to the tip angle of a screw element with a double-flighted Erdmenger screw profile. Rotating the first channel zone about an angle of less than π results in the two closing zones between the two zones consisting of flank zones and grooved zones being unequal in size. Rotation proceeds about an angle, such that the closing angle of one of the two closing zones is preferably greater than the 1.2 times, particularly preferably greater than 1.6 times the tip angle of a double-flighted Erdmenger screw profile with a corresponding outer screw radius and most preferably greater than the barrel opening angle, which is calculated by 2*arccos(0.5*a/ra). In these cases the second of the two closing zones particularly preferably consists of a tip zone, whereby the screw profile obtained consists of a total of 3 tip zones.

It has surprisingly been found that a first channel zone may be composed of the flank zones and grooved zones of two different quarters of one screw profile. The second channel zone may be composed of one of the two quarters of the first channel zone or of a combination of the two quarters of the first channel zone. It is also possible for the second channel zone to be composed of one or two further quarters. In particular it is possible for one or more of the quarters to be based on a double-flighted Erdmenger screw profile. In all the stated cases, it is possible to generate profiles of screw elements according to the invention.

With the simple methods presented for producing screw profiles of screw elements according to the invention, it is possible to generate both symmetrical and asymmetrical screw profiles. Screw profiles may additionally be generated in which, after rotation by π/2, the generated screw profile is identical to or different from the generating screw profile.

The outer screw radius normalized to the centreline distance of screw elements according to the invention is preferably in the range from 0.51 to 0.66 and particularly preferably in the range from 0.52 to 0.575.

The invention is not limited to screw elements of the currently conventional modular construction consisting of a screw with individual screw elements and core shafts, but also to screws of solid construction. The term "screw elements" should thus also be taken to mean screws of solid construction.

The screw elements to be used according to the invention may be used as conveying elements, kneading elements and/or mixing elements.

A conveying element is known to be distinguished in that (see for example Kohlgrüber, pages 227-248) the screw profile is rotated and extended continuously helically in the axial direction. The conveying element may have right- or left-handed flights. The pitch of the conveying element is preferably in the range from 0.1 to 10 times the centreline distance, the pitch being taken to mean the axial length which is necessary for one complete rotation of the screw profile, and the axial length of a conveying element is preferably in the range from 0.1 to 10 times the centreline distance.

A kneading element is known to be distinguished in that (see for example Kohlgrüber, pages 227-248) the screw profile extends discontinuously in the axial direction in the form of kneading discs. The kneading discs may be arranged in a right- or left-handed manner or neutrally. The axial length of the kneading discs is preferably in the range from 0.05 to 10 times the centreline distance. The axial distance between two neighbouring kneading discs is preferably in the range from 0.002 to 0.1 times the centreline distance.

As is known, mixing elements are formed (see for example Kohlgrüber, pages 227-248) by constructing conveying elements with openings in the screw tips. The mixing elements may be right- or left-handed. Their pitch is preferably in the range from 0.1 to 10 times the centreline distance and the axial length of the elements is preferably in the range from 0.1 times to 10 times the centreline distance. The openings preferably take the form a U- or V-shaped groove, which are preferably arranged in a counter-conveying or axially parallel manner.

It is known to a person skilled in the art that directly self-wiping screw profiles cannot be inserted directly into a twin-screw extruder, but rather clearances are necessary between the screws. Various possible strategies for this purpose are described in Kohlgrüber on page 28 et seq. For screw profiles of screw elements according to the invention, clearances in the range from 0.001 to 0.1, relative to the diameter of the screw profile, are used, preferably from 0.002 to 0.05 and particularly preferably from 0.004 to 0.02. The clearances may, as is known to a person skilled in the art, be of different dimensions or identical between screw and barrel and between screw and screw. The clearances may also be constant or, within the stated limits, variable. It is also possible to displace a screw profile within the clearances. Possible clearance strategies are the possibilities, described in Kohlgrüber on page 28 et seq., of centreline distance enlargement, longitudinal section offsets and three-dimensional offsets, all of which are known to a person skilled in the art. In the case of centreline distance enlargement, a screw profile of a relatively small diameter is constructed and spaced further apart by the amount of clearance between the screws. In the longitudinal section offset method, the longitudinal section profile curve (parallel to the axis) is displaced inwards by half the screw-screw clearance. In the three-dimensional offset method, starting from the three-dimensional curve on which the screw elements clean one another, the screw element is reduced in size in the direction perpendicular to the faces of the fully self-wiping profile by half the clearance between screw and screw. The longitudinal section and three-dimensional offset methods are preferred, the three-dimensional offset method being particularly preferred.

The profiles of screw elements according to the invention may be constructed using a process described in PCT/EP2009/003549. One possible process is described below.

The process for generating closely intermeshing, self-cleaning, co-rotating screw profiles with a selectable centreline distance a between the axes of rotation of a generating and a generated screw profile is characterized in that the generating screw profile is formed from n circular arcs and the generated screw profile is formed from n' circular arcs, wherein the generating screw profile and the generated screw profile lie in one plane, the axis of rotation of the generating screw profile and the axis of rotation of the generated screw profile are in each case perpendicular to said plane of the screw profiles, the point of intersection of the axis of rotation of the generating screw profile with said plane being designated as the point of rotation of the generating screw profile and the point of intersection of the axis of rotation of the generated screw profile with said plane being designated as the point of rotation of the generated screw profile, the number of circular arcs n of the generating screw profile is selected, n being an integer which is greater than or equal to 1, an outer radius ra of the generating screw profile is selected, wherein ra may assume a value which is greater than 0 (ra>0) and less than or equal to the centreline distance (ra≤a), a core radius ri of the generating screw profile is selected, wherein ri may assume a value which is greater than or equal to 0 (ri≥0) and less than or equal to ra (ri≤ra), the circular arcs of the generating screw profile are arranged clockwise or counterclockwise around the axis of rotation of the generating screw profile in accordance with the following rules of arrangement, such that:

all the circular arcs of the generating screw profile merge tangentially into one another in such a way that a continuous, convex screw profile is obtained, wherein a circular arc, whose radius is equal to 0, is preferably treated as a circular arc whose radius is equal to eps, wherein eps is a very small positive real number which tends towards 0 (eps<<1, eps→0), each of the circular arcs of the generating screw profile lies within or at the limits of a circular ring with the outer radius ra and the core radius ri, the centre point of which lies on the point of rotation of the generating screw profile, at least one of the circular arcs of the generating screw profile touches the outer radius ra of the generating screw profile, at least one of the circular arcs of the generating screw profile touches the core radius ri of the generating screw profile, the magnitude of a first circular arc of the generating screw profile, which is established by an angle $\alpha\_1$ and a radius $r\_1$, is selected such that the angle $\alpha\_1$ in radians is greater than or equal to 0 and less than or equal to $2\pi$, wherein $\pi$ should be taken to mean the circle constant ($\pi \approx 3.14159$), and the radius $r\_1$ is greater than or equal 0 and less than or equal to the centreline distance a, and the position of this first circular arc of the generating screw profile, which is obtained by the positioning of two different points of this first circular arc, is established in accordance with said rules of arrangement, wherein a first point to be positioned of this first circular arc is preferably a starting point belonging to this first circular arc and wherein a second point to be positioned of this first circular arc is preferably the centre point belonging to this first circular arc, the magnitudes of further n−2 circular arcs of the generating screw profile, which are established by the angle $\alpha\_2, \ldots, \alpha\_(n-1)$ and the radii $r\_2, r\_(n-1)$, are selected such that the angle $\alpha\_2, \ldots, \alpha\_(n-1)$ in radians is greater than or equal to 0 and less than or equal to 2π and the radii r_2, r_(n−1) are greater than or equal to 0 and less than or equal to the centreline distance a, and the positions of these further n−2 circular arcs of the generating screw profile are established in accordance with said rules of arrangement, the magnitude of a last circular arc of the generating screw profile, which is established by an angle α_n and a radius r_n, is determined in that the sum of the n angles of the n circular arcs of the generating screw profile in radians is equal to 2π, wherein the angle α_n in radians is greater than or equal to 0 and less than or equal to 2π, and the radius r_n closes the generating screw profile, wherein the radius r_n is greater than or equal to 0 and less than or equal to the centreline distance a, and the position of this last circular arc of the generating screw profile is established in accordance with said rules of arrangement, the n' circular arcs of the generated screw profile are obtained from the n circular arcs of the generating screw profile in that the number of circular arcs n' of the generated screw profile is equal to the number of circular arcs n of the generating screw profile, n' being an integer, the outer radius ra' of the generated screw profile is equal to the difference of the centreline distance minus the core radius ri of the generating screw profile (ra'=a−ri), the core radius ri' of the generated screw profile is equal to the difference of the centreline distance minus the outer radius ri of the generating screw profile (ri'=a−ra), the angle α_i' of the i'th circular arc of the generated screw profile is equal to the angle α_i of the ith circular arc of the generating screw profile, i and i' being integers which pass jointly through all the values in the range from 1 to the number of circular arcs n or n' respectively (α_1'=α_1, . . . , α_n'=α_n), the sum of the radius r_i' of the i'th circular arc of the generated screw profile and of the radius r_i of the ith circular arc of the generating screw profile is equal to the centreline distance a, i and i' being integers, which pass jointly through all the values in the range from 1 to the number of circular arcs n or n' respectively (r_1'+r_1=a, . . . , r_n'+r_n=a), the centre point of the i'th circular arc of the generated screw profile is at a distance from the centre point of the ith circular arc of the generating screw profile which is equal to the centreline distance a, and the centre point of the i'th circular arc of the generated screw profile is at a distance from the point of rotation of the generated screw profile which is equal to the distance of the centre point of the ith circular arc of the generating screw profile from the point of rotation of the generating screw profile, and the connecting line between the centre point of the i'th circular arc of the generated screw profile and the centre point of the ith circular arc of the generating screw profile is a line parallel to a connecting line between the point of rotation of the generated screw profile and the point of rotation of the generating screw profile, i and i' being integers which pass jointly through all the values in the range from 1 to the number of circular arcs n or n' respectively (i'=i), a starting point of the i'th circular arc of the generated screw profile lies in a direction relative to the centre point of the i'th circular arc of the generated screw profile which is opposite to that direction which has a starting point of the ith circular arc of the generating screw profile relative to the centre point of the ith circular arc of the generating screw profile, i and i' being integers which pass jointly through all the values in the range from 1 to the number of circular arcs n or n' respectively (i'=i).

According to the invention, the circular arcs of the generating and generated screw profiles should be selected or matched to one another such that the sum of all the tip angles of a pair of screw elements is greater than or equal to 0 and less than 2*π−8*arccos(0.5*a/ra), the number of the tip zones of a pair of screw elements is greater than 4 and each screw element of a pair of screw elements comprises two screw profile zones, which consist in each case of flank zones and grooved zones and in which the sum of the flank and groove angles is in each case greater π/2.

From the process described for producing smooth, closely intermeshing, self-cleaning, co-rotating screw profiles, it follows for the generated screw profile that the generated screw profile is continuous, the generated screw profile is convex, each of the circular arcs of the generating screw profile merge tangentially into the following circular arc of the generated screw profile, wherein a circular arc, whose radius is equal to 0, is preferably treated as a circular arc whose radius is equal to eps, wherein eps is a very small positive real number which tends towards 0 (eps<<1, eps→0), each of the circular arcs of the generated screw profile lies within or at the limits of a circular ring with the outer radius ra' and the core radius ri', the centre point of which lies on the point of rotation of the generated screw profile, at least one of the circular arcs of the generated screw profile touches the outer radius ra' of the generated screw profile, at least one of the circular arcs of the generated screw profile touches the core radius ri' of the generated screw profile.

It additionally follows from the above-described process for producing smooth, closely intermeshing, self-cleaning, co-rotating screw profiles that only in the case in which the core radius ri of the generating screw profile is equal to the difference of the centreline distance a minus the outer radius ra of the generating screw profile (ri=a−ra) is the outer radius ra' of the generated screw profile equal to the outer radius ra of the generating screw profile and the core radius ri' of the generated screw profile equal to the core radius ri of the generating screw profile.

If the generating screw profile has a circular arc with the radius r_i=0, the screw profile comprises a kink at the location of the circular arc, the magnitude of which is characterized by the angle α_i. If the generated screw profile has a circular arc with the radius r_i'=0, the screw profile comprises a kink at the location of the circular arc, the magnitude of which is characterized by the angle α_i'.

The above-described process for producing smooth, closely intermeshing, self-cleaning, co-rotating screw profiles is furthermore distinguished in that it can be performed solely with a set square and pair of compasses. The tangential transition between the ith and the (i+1)th circular arc of the generating screw profile is thus designed by describing a circle with the radius r_(i+1) about the end point of the ith circular arc, and the point of intersection, located closer to the point of rotation of the generating screw profile, of this circle with the straight line which is defined by the centre point and the end point of the ith circular arc is the centre point of the (i+1)th circular arc. In practice, instead of a set square and pair of compasses, computer software is used to design the screw profiles.

The screw profiles generated using the general process are independent of the number of flights z. The generated screw profile may be different from the generating screw profile. As a person skilled in the art will readily understand from the explanations, the above-described process is suitable in particular for generating transition elements between screw elements with different numbers of flights. On the basis of a z-flighted screw profile, it is possible to change the generating and the generated screw profiles step by step such that a screw profile is ultimately obtained which has a number of flights z' different from z. It is in this respect admissible to reduce or increase the number of circular arcs during the transition.

In the case of symmetrical profiles, the process may be simplified by designing only parts of the screw profiles and generating the missing parts from the designed parts by symmetry operations. This is described in detail in PCT/EP2009/003549.

It is recommended that the process for producing screw profiles be carried out on a computer. The dimensions of the screw elements are then present in a form in which they may be supplied to a CAD milling machine for producing the screw elements.

Once the profiles have been generated in the manner described, the screw elements according to the invention may be produced for example with a milling machine. Preferred materials for producing the screw elements are steels, in particular nitriding steels and special steels.

The present invention further provides use of the screw elements according to the invention in multi-screw extruders. The screw elements according to the invention are preferably used in twin-screw extruders. The screw elements may be present in the multi-screw extruders in the form of kneading or conveying elements. It is likewise possible to combine kneading and conveying elements with one another in one extruder. The screw elements according to the invention may also be combined with other screw elements, which are known according to the prior art.

Use of the novel screw elements according to the invention in multi-screw extruders is distinguished in that exposure of the product to thermal loading in the tip zone is minimized by the reduced tip zones. Use according to the invention increases efficiency during pressure build-up and minimizes product heating as a result of lower energy input.

The present invention further provides a process for extruding plastic compositions in a twin-screw or multi-screw extruder using screw elements according to the invention, characterized in that the sum of all the tip angles of a pair of screw elements is greater than or equal to 0 and less than $2*\pi-8*\arccos(0.5*a/ra)$, the number of tip zones of a pair of screw elements is greater than 4, each screw element of a pair of screw elements comprises two screw profile zones, which consist in each case of flank zones and grooved zones and in which the sum of the flank and groove angles is in each case greater than $\pi/2$.

The sum of all the tip angles of a pair of screw elements according to the invention is preferably less than $0.8*(2*\pi-8*\arccos(0.5*a/ra))$, particularly preferably less than $0.6*(2*\pi-8*\arccos(0.5*a/ra))$ and most preferably less than $0.4*(2*\pi-8*\arccos(0.5*a/ra))$.

The number of tip zones of a pair of screw elements according to the invention is preferably equal to 6 and particularly preferably equal to 8. The number of tip zones of a screw element according to the invention is preferably equal to 2 and particularly preferably equal to 4.

The sum of the angles of a screw profile zone, which consists of flank zones and grooved zones, is preferably greater than $2*\pi/3$.

In screw elements according to the invention, the generating screw profile may be individually configured. In particular, the edges which define the tip zones may be rounded.

Plastic compositions which may be extruded highly efficiently according to the invention while gentle treatment of the product is simultaneously ensured, are for example suspensions, pastes, glass, ceramic compositions, metals in the form of a melt, plastics, plastics melts, polymer solutions, elastomer and rubber compositions.

Plastics and polymer solutions are preferably used, particularly preferably thermoplastic polymers. Preferred thermoplastic polymers are preferably at least one of the series of polycarbonate, polyamide, polyester, in particular polybutylene terephthalate and polyethylene terephthalate, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl) methacrylate, polyphenylene oxide, polyphenylene sulfide, polyether ketone, polyarylether ketone, styrene polymers, in particular polystyrene, styrene copolymers, in particular styrene-acrylonitrile copolymer, acrylonitrile-butadiene-styrene block copolymers and polyvinyl chloride. Blends of the listed plastics are likewise preferably used, these being understood by a person skilled in the art to be a combination of two or more plastics.

Further preferred feed materials are rubbers. Preferred rubbers are preferably at least one from the series of styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta percha, acrylate rubber, fluororubber, silicone rubber, sulfide rubber, chlorosulfonyl-polyethylene rubber. A combination of two or more of the listed rubbers, or a combination of one or more rubbers with one or more plastics is of course also possible.

These thermoplastics and elastomers may be used in pure form or as mixtures with fillers and reinforcing materials, such as in particular glass fibres, as mixtures with one another or with other polymers or as mixtures with conventional polymer additives.

In one preferred embodiment the plastics compositions, in particular the polymer melts and mixtures of polymer melts, have additives admixed with them. These may be placed as solids, liquids or solutions in the extruder together with the polymer or at least some of the additives or all the additives are supplied to the extruder via a side stream.

Additives may impart many different characteristics to a polymer. They may for example colorants, pigments, processing auxiliaries, fillers, antioxidants, reinforcing materials, UV absorbers and light stabilizers, metal deactivators, peroxide scavengers, basic stabilizers, nucleating agents, benzofurans and indolinones active as stabilizers or antioxidants, mould release agents, flame-retardant additives, antistatic agents, dye preparations and melt stabilizers. Examples of these are carbon black, glass fibres, clay, mica, graphite fibres, titanium dioxide, carbon fibres, carbon nanotubes, ionic liquids and natural fibres.

The invention is explained in greater detail below by way of example with reference to the figures without however being restricted thereto. All the figures were generated with the assistance of computer software.

To generate and/or describe screw profiles and elements, it is sensible to make use of dimensionless characteristic values, so as to simplify transferability to different extruder sizes. An appropriate reference variable for geometric variables such as for example lengths or radii is the centreline distance a, since this variable cannot be modified in an extruder. The dimensionless centreline distance obeys A=a/a=1. The dimensionless outer screw radius of a screw profile obeys RA=ra/a. The dimensionless core radius of a screw profile is calculated as RI=ri/a. The dimensionless flight depth of a screw profile is calculated as H=h/a=RA−RI.

BRIEF DESCRIPTION OF THE DRAWINGS

In the figures all the geometric variables are used in their dimensionless form. All angles are stated in radians.

FIG. 7 shows a section perpendicular to the axes of rotation of a preferred pair of screw elements according to the invention with asymmetric screw profiles.

FIGS. 10a and 10b show further preferred screw profiles of screw elements according to the invention, of which the sum of the tip angles of all the tip zones is equal to 0.

FIG. 14a shows, by way of example, a pair of screw elements according to the invention, configured as conveying elements, whose screw profile is based on FIG. 2a, FIG. 14b shows, by way of example, a pair of screw elements according to the invention, configured as kneading elements, whose screw profile is based on FIG. 2a.

FIG. 15b shows a plan view of the pair of screw elements according to FIG. 15a, and FIG. 15c shows a pair of screw elements, configured as conveying elements, whose screw profile is based on FIG. 15a.

DETAILED DESCRIPTION OF THE INVENTION

FIGS. 1a and 2a, FIGS. 3 to 6, FIGS. 8 and 9 and FIG. 15a in each case show in cross section a quarter of a screw profile of a screw element according to the invention. All these figures have the same structure, which is described in detail below. In the middle of the figures is located the xy system of coordinates, at the origin of which is located the point of rotation of the screw profile. The circular arcs of the screw profile are distinguished by thick, continuous lines, which are provided with the respective numbers of the circular arcs. The centre points of the circular arcs are illustrated by small circles. The centre points of the circular arcs are connected by thin, continuous lines both with the starting point and with the end point of the associated circular arc. The straight line FP is illustrated by a thin, dotted line. The outer screw radius RA is distinguished by a thin, dashed line, the numerical value of which is indicated bottom right in the figure to four significant digits. On the right next to the figures the radius R, the angle α and the x and y coordinates of the circular arc centre point Mx and My are stated for each circular arc in each case to four significant digits. These details unambiguously define the screw profile. The screw profiles are in each case mirror-symmetrical for the x and y axes, such that the entire screw profiles are obtained by mirroring of the illustrated quarter at the x and y axes.

Screw profiles in which a quarter of the screw profile consists of a total of n circular arcs are described below as n-circle screw profiles.

In FIGS. 1a and 2a, FIGS. 3 to 6, FIGS. 8 and 9 and FIG. 15a the circular arcs of an n-circle screw profile are numbered in that the first n/2 circular arcs are numbered consecutively in ascending order 1 to n/2 and the last n/2 circular arcs are numbered consecutively in descending order (n/2)' to F. The circular arc n/2 and the circular arc (n/2)' each touch the straight line FP. Each circular arc i of the screw profile corresponds to a circular arc i' of the screw profile. The radius of a circular arc i' is calculated from the difference of the centreline distance minus the radius of the circular arc i, thus R_i'=A−R_i. The angle of a circular arc i' is equal to the angle of a circular arc i, thus α_i'=α_i. This means that a tip zone with a circular arc j is equal to a grooved zone with a circular arc j'. This means that a grooved zone with a circular arc j is equal to a tip zone with a circular arc j'.

Figure 1A:
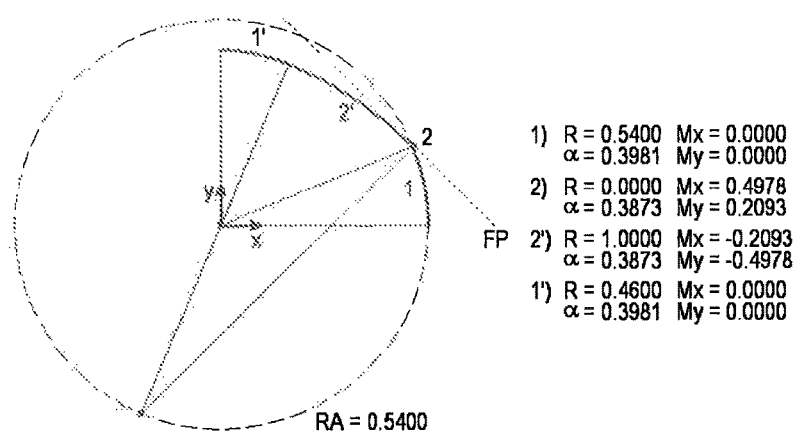
FIG. 1a shows a quarter of a double-flighted Erdmenger screw profile according to the prior art.

FIG. 1: FIG. 1a shows a quarter of a double-flighted Erdmenger screw profile according to the prior art, which is made up of 4 circular arcs. It is characteristic of Erdmenger screw profiles that the radius R_1=RA, the radius R_2=0, the radius R_2'=A=1 and the radius R_1'=A−RA=RI. The angles α_1, α_2, α_2' and α_1' depend on the outer screw radius and on the centreline distance. The angle α_1 is equal to the half tip angle of a double-flighted Erdmenger screw profile. The sum of the tip angles of a pair of screw elements with a double-flighted Erdmenger screw profile is thus calculated as 8*α_1. The Erdmenger screw profile comprises a kink at the location of the radius R_2. The "magnitude of the kink" is determined by the angle $\alpha\_2$, i.e. the transition from the circular arc 1 to the circular arc 2' is brought about by rotation about the angle $\alpha\_2$.

In FIG. 1*a* the dimensionless outer screw radius RA=0.54. The half tip angle is $\alpha\_1$=0.3981 and the sum of the tip angles of a pair of screw elements is $8*\alpha\_1$=3.1847.

Figure 1B:
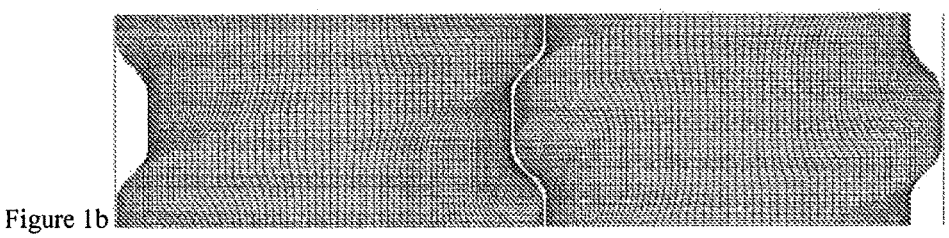
FIG. 1b shows by way of example a pair of screw elements, configured as conveying elements, whose screw profile is based on FIG. 1a, FIG. 1c shows a plan view of the pair of screw elements according to FIG. 1b.

FIG. 1*b* shows by way of example a pair of screw elements, configured as conveying elements, whose screw profile is based on FIG. 1*a*. The clearance between the two conveying elements amounts to S=0.008. The clearance between the two conveying elements and the barrel amounts to D=0.004. The pitch of the conveying elements amounts to T=1.08. The length of the conveying elements amounts to 0.54, which corresponds to rotation of the screw profiles about an angle of $\pi$. The barrel is illustrated by thin, continuous lines to the left and right of the two conveying elements. A possible computational grid is further illustrated on the surfaces of the two conveying elements, which grid may be used for calculating flow in twin- and multi-screw extruders. The number of grid elements is equal to 160 in the circumferential direction and equal to 80 in the axial direction.

Figure 1C:
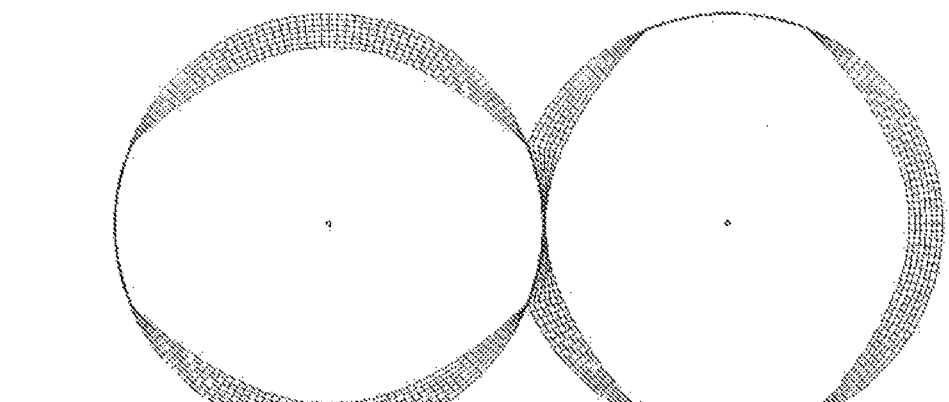

FIG. 1*c* shows a plan view of the pair of screw elements according to FIG. 1*b*. The free volume between the conveying elements and the barrel is provided with a possible computational grid, which may be used for calculating flow in twin- and multi-screw extruders. The number of grid elements is equal to 160 in the circumferential direction and equal to 6 in the radial direction. The axes of rotation of the two screw elements are labelled by small circles.

Figure 2A:
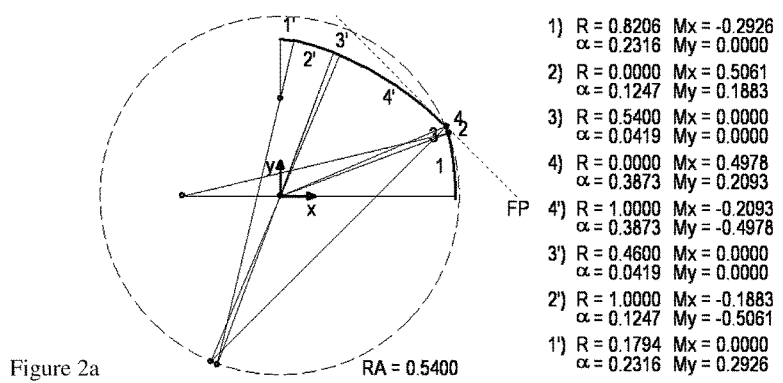
FIG. 2a shows a quarter of a preferred screw profile of a screw element according to the invention, which is made up of 8 circular arcs.

FIG. 2: FIG. 2*a* shows a quarter of a preferred screw profile of a screw element according to the invention, which is made up of 8 circular arcs. The dimensionless outer screw radius amounts to RA=0.54. The radius R_1 is equal to 0.8206. The maximum dimensionless distance of the circular arc 1 from the outer screw radius is calculated as RA−(Mx+R_1)=0.54−(−0.2926+0.8206)=0.012. The sum of the tip angles $\alpha\_1$ and $\alpha\_2$ is equal to 0.3563. The tip zone is determined by the circular arc 3 which lies on the outer screw radius. The tip angle $\alpha\_3$ is equal to 0.0419. The grooved zone is determined by the circular arc 3', which lies on the core radius. The groove angle $\alpha\_3$' is equal to 0.0419. The sum of the tip angles of all the tip zones for a pair of screw elements according to the invention amounts to $8*0.0419$=0.3352 and thus only approx. 0.105 times the sum of the tip angles of a pair of screw elements with a double-flighted Erdmenger screw profile. Half of a zone, which consists of flank zones and grooved zones, is provided by the circular arcs 4, 4', 3', 2' and F. Twice the sum of the associated flank and groove angles amounts to 2.3456 and is greater than $2*\pi/3$.

Figure 2B:
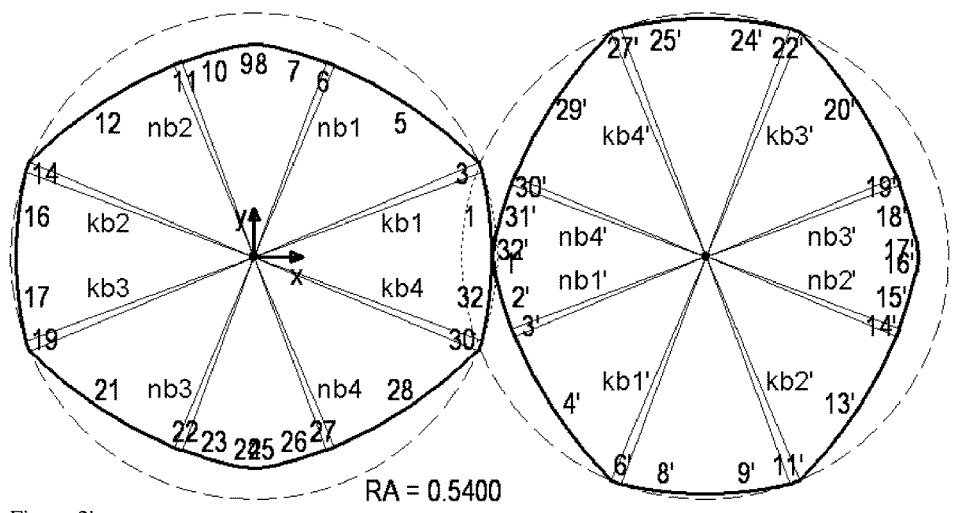
FIG. 2b shows a section of a pair of screw elements according to the invention, perpendicular to the axes of rotation, whose screw profile is based on FIG. 2a, FIGS.

FIG. 2*b* shows a section of a pair of screw elements according to the invention perpendicular to the axes of rotation, whose screw profile is based on FIG. 2*a*. By mirroring the screw profile of FIG. 2*a* at the x axis and by subsequent mirroring of the screw profile of FIG. 2*a* and of the screw profile of FIG. 2*a* mirrored at the x axis at the y axis, a generating screw profile is obtained of a pair of screw elements according to the invention. By rotating the generating screw profile by $\pi/2$ and by subsequent displacement by A along the x axis, the generated screw profile is obtained.

The generated screw profile is obtained from the generating screw profile. Generating and generated screw profile are mutually interchangeable.

The screw barrel, which is obtained from two mutually interpenetrating bores with in each case the radius RA=0.54 and the distance A=1, is illustrated by a thin, dashed line. Where the two barrel bores interpenetrate, the two bores are distinguished by thin, dotted lines. The centre points of the two barrel bores are identical to the two points of rotation of the screw profiles and are distinguished in each case by a small circle. The circular arcs of the screw profiles are distinguished by a thick, continuous line. The circular arcs of the left-hand screw profile, of the generating screw profile, are consecutively numbered (1-32), wherein for reasons of clarity the numbers of circular arcs 2, 4, 13, 15, 18, 20, 29 and 31 are omitted. The circular arcs 2, 4, 13, 15, 18, 20, 29 and 31 have in each case the radius 0. The circular arcs of the right-hand screw profile, of the generated screw profile, are consecutively numbered (1'-32'), wherein for reasons of clarity the numbers of circular arcs 5', 7', 10', 12', 21', 23', 26' and 28' are omitted. The circular arcs 5', 7', 10', 12', 21', 23', 26' and 28' have in each case the radius 0. The start and end of a tip or grooved zone of the generating and generated screw profiles are distinguished by thin, continuous lines.

Each circular arc i of the generating screw profile corresponds to a circular arc i' of the generated screw profile. The radius of a circular arc i' is calculated from the difference of the centreline distance minus the radius of the circular arc i, thus $R\_i'=A-R\_i$. The angle of a circular arc i' is equal to the angle of a circular arc i, thus $\alpha\_i'=\alpha\_i$. This means that a tip zone of the generating screw profile is equal to a grooved zone of the generated screw profile. This further means that a grooved zone of the generating screw profile is equal to a tip zone of the generated screw profile.

The generating screw profile consists of the 4 tip zones kb1, kb2, kb3 and kb4. The generated screw profile consists of the 4 grooved zones nb1', nb2', nb3' and nb4', which correspond to the 4 tip zones of the generating screw profile. The tip zone kb1 consists of the circular arc 3. The tip zone kb2 consists of the circular arc 14. The tip zone kb3 consists of the circular arc 19. The tip zone kb4 consists of the circular arc 30. The grooved zone nb1' consists of the circular arc 3'. The grooved zone nb2' consists of the circular arc 14'. The grooved zone nb3' consists of the circular arc 19'. The grooved zone nb4' consists of the circular arc 30'.

The generating screw profile consists of the 4 grooved zones nb1, nb2, nb3 and nb4. The generated screw profile consists of the 4 tip zones kb1', kb2', kb3' and kb4', which correspond to the 4 grooved zones of the generating screw profile. The grooved zone nb1 consists of the circular arc 6. The grooved zone nb2 consists of the circular arc 11. The grooved zone nb3 consists of the circular arc 22. The grooved zone nb4 consists of the circular arc 27. The tip zone kb1' consists of the circular arc 6'. The tip zone kb2' consists of the circular arc 11'. The tip zone kb3' consists of the circular arc 22'. The tip zone kb4' consists of the circular arc 27'.

In total the number of tip zones of the pair of screw elements according to the invention shown in FIG. 2*b* is 8 and according to the invention is greater than 4. The sum of the tip angles of all the tip zones amounts to $8*0.0419$=0.3352 and thus only to approx. 0.105 times the sum of the tip angles of a pair of screw elements with a double-flighted Erdmenger screw profile.

A first zone of the generating screw profile, which consists of flank zones and grooved zones and in which the sum of the flank and groove angles is greater than $\pi/2$, preferably greater than $2*\pi/3$, consists of the circular arcs 4 to 13. The sum of the flank and groove angles amounts to 2.3456 and is greater than $2*\pi/3$. A second zone of the generating screw profile, which consists of flank zones and grooved zones and in which the sum of the flank and groove angles is greater than $\pi/2$, preferably greater than $2*\pi/3$, consists of the circular arcs 20 to 29. The sum of the flank and groove angles amounts to 2.3456 and is greater than $2*\pi/3$.

A first zone of the generated screw profile, which consists of flank zones and grooved zones and in which the sum of the flank and groove angles is greater than $\pi/2$, preferably greater than $2*\pi/3$, consists of the circular arcs 12' to 21'. The sum of the flank and groove angles amounts to 2.3456 and is greater than $2*\pi/3$. A second zone of the generated screw profile, which consists of flank zones and grooved zones and in which the sum of the flank and groove angles is greater than $\pi/2$, preferably greater than $2*\pi/3$, consists of the circular arcs 28' to 32' and 1' to 5'. The sum of the flank and groove angles amounts to 2.3456 and is greater than $2*\pi/3$.

Figures 3A, 3B, 4A, 4B:
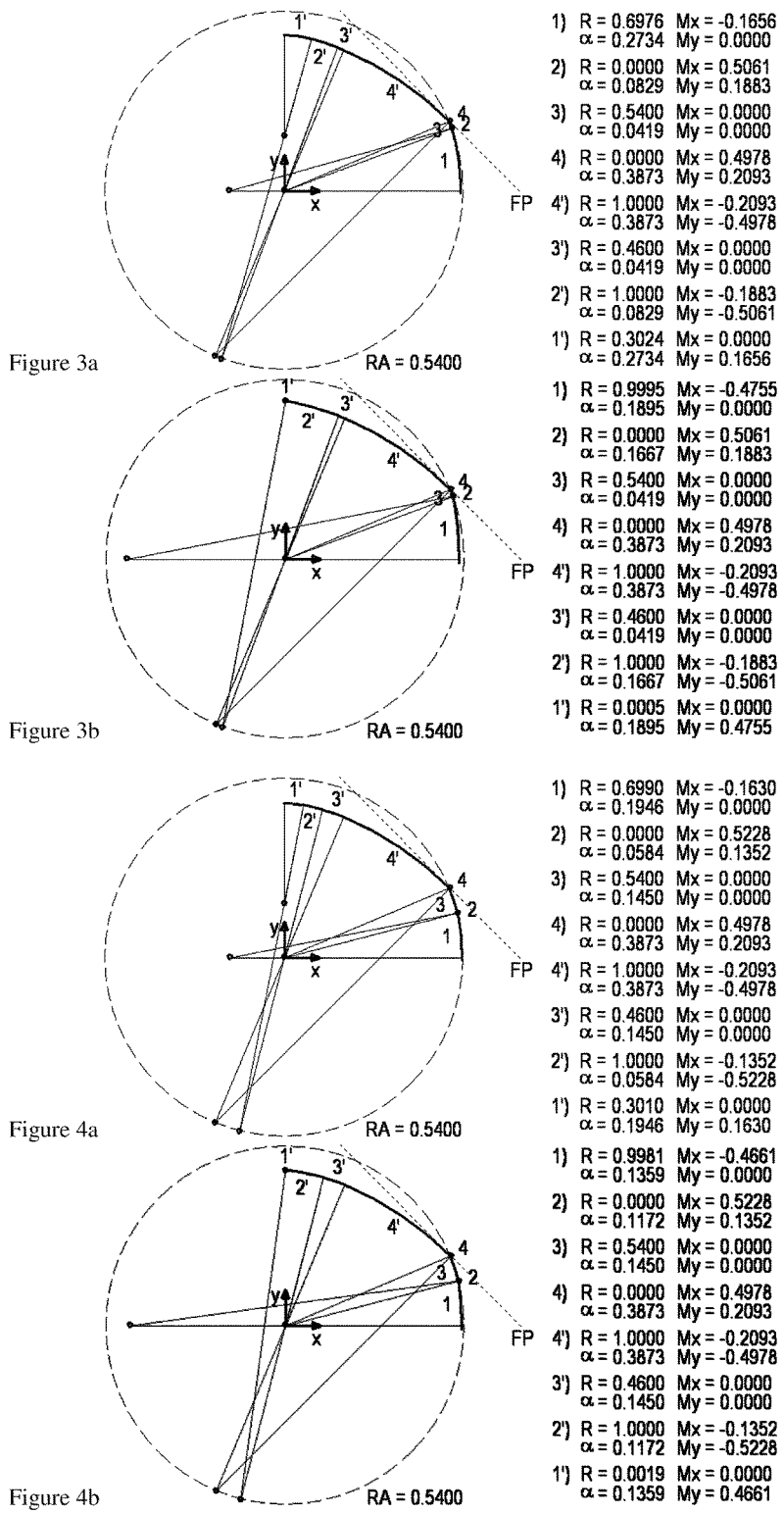
FIGS. 3a and 3b each show a quarter of a further preferred screw profile of a screw element according to the invention, which is made up in each case of 8 circular arcs, FIGS. 4a and 4b each show a quarter of a further preferred screw profile of a screw element according to the invention, which is made up in each case of 8 circular arcs, FIGS. 5a-5d each show a quarter of a further preferred screw profile of a screw element according to the invention, which is made up in each case of 8 circular arcs.

FIG. 3: FIGS. 3*a* and 3*b* each show a quarter of a further preferred screw profile of a screw element according to the invention, which is made up in each case of 8 circular arcs. In FIGS. 3*a* and 3*b* the outer screw radius amounts in each case to RA=0.54. The radius R1 is equal to 0.6976 in FIG. 3*a* and equal to 0.9995 in FIG. 3*b*. In FIG. 3*a* the maximum dimensionless distance of the circular arc 1 from the outer screw radius is calculated as 0.008 and in FIG. 3*b* as 0.016. The sum of the tip angles $\alpha\_1$ and $\alpha\_2$ is equal to 0.3563 in both figures. The tip zone is provided in both figures by the circular arc 3, which lies in each case on the outer screw radius. The tip angle $\alpha\_3$ is in each case equal to 0.0419. The grooved zone is provided in each case by the circular arc 3', which in each case lies on the core radius. The groove angle $\alpha\_3'$ is in each case equal to 0.0419. The sum of the tip angles of all the tip zones for a pair of screw elements according to the invention amounts in each case to $8*0.0419=0.3352$ for FIGS. 3*a* and 3*b* and thus to only approx. 0.105 times the sum of the tip angles of a pair of screw elements with a double-flighted Erdmenger screw profile. Half of a zone, which consists of flank zones and grooved zones, is provided by the circular arcs 4, 4', 3', 2' and F. Twice the sum of the associated flank and groove angles amounts to 2.3456 and is greater than $2*\pi/3$.

By varying the radius R_1 and by displacing the x coordinate Mx_1 of the centre point of the circular arc 1, it is possible to adjust the maximum dimensionless distance of the circular arc 1 from the outer screw radius while keeping the tip angle of the tip zone constant.

FIG. 4: FIGS. 4*a* and 4*b* each show a quarter of a further preferred screw profile of a screw element according to the invention, which is made up in each case of 8 circular arcs. In FIGS. 4*a* and 4*b* the outer screw radius amounts in each case to RA=0.54. The radius R_1 is equal to 0.6990 in FIG. 4*a* and equal to 0.9981 in FIG. 4*b*. In FIG. 4*a* the maximum dimensionless distance of the circular arc 1 from the outer screw radius is calculated as 0.004 and in FIG. 4*b* as 0.008. The sum of the tip angles $\alpha\_1$ and $\alpha\_2$ is equal to 0.2531 in both figures. The tip zone is provided in both figures by the circular arc 3, which lies in each case on the outer screw radius. The tip angle $\alpha\_3$ is in each case equal to 0.1450. The grooved zone is provided in each case by the circular arc 3', which in each case lies on the core radius. The groove angle $\alpha\_3'$ is in each case equal to 0.1450. The sum of the tip angles of all the tip zones for a pair of screw elements according to the invention amounts in each case to $8*0.1450=1.1600$ for FIGS. 4*a* and 4*b* and thus to only approx. 0.364 times the sum of the tip angles of a pair of screw elements with a double-flighted Erdmenger screw profile. Half of a zone, which consists of flank zones and grooved zones, is provided by the circular arcs 4, 4', 3', 2' and F. Twice the sum of the associated flank and groove angles amounts to 2.3456 and is greater than $2*\pi/3$.

By varying the radius R_1 and by displacing the x coordinate Mx_1 of the centre point of the circular arc 1, it is possible to adjust the maximum dimensionless distance of the circular arc 1 from the outer screw radius while keeping the tip angle of the tip zone constant. It becomes clear in conjunction with FIGS. 3*a* and 3*b* that the tip angle of the tip zone may also be adjusted.

A screw profile of a screw element according to the invention may clearly be obtained, inter alia, by selecting the x coordinate Mx_1 and radius R_1 of the circular arc 1 and thus "removing" a zone from the tip zone of a double-flighted Erdmenger screw profile. To ensure self-cleaning, a zone has then to be "added" again in the grooved zone of a double-flighted Erdmenger screw profile. This is effected by means of the circular arcs 2' and F.

Through free selection of the magnitude of the tip angle of the tip zone, it is possible purposefully to adjust the exposure of the product to thermal loading in the case of screw elements according to the invention and to reduce it relative to double-flighted Erdmenger screw profiles. Overall, energy input falls and pressure build-up efficiency rises.

In addition, FIGS. 3*a* and 4*b* are characterized in that the position of the starting point of the circular arc 1 and the position of the end point of the circular arc 1' are in each case identical. Mirroring FIG. 3*a* at the x axis and mirroring the mirrored FIG. 3*a* and FIG. 4*b* at the y axis and combining a screw profile from FIG. 4*b*, FIG. 4*b* mirrored at the y axis, FIG. 3*a* mirrored at the x and y axes and FIG. 3*a* mirrored at the x axis results in a screw profile of a screw element according to the invention in which the tip angles of the tip zones differ in size. It is admissible to configure each quarter of a screw profile and thus the tip angle of the respective tip zones mutually independently and to combine them into a screw profile for screw elements according to the invention, provided that the starting points of the circular arcs 1 and the end points of the circular arcs 1' are in each case identical.

Figures 5A, 5B, 5C, 5D:
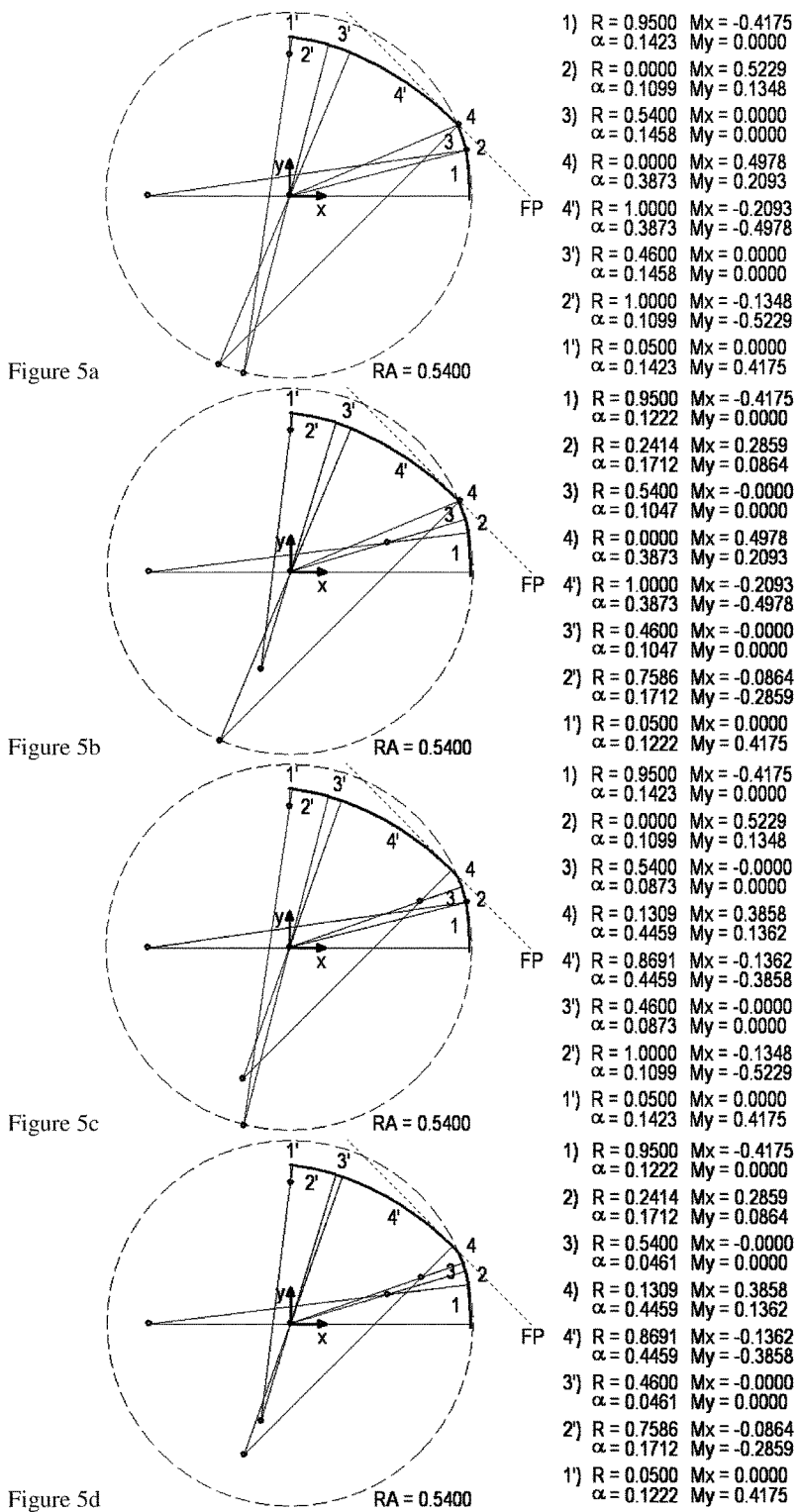

FIG. 5: FIGS. 5*a* to 5*d* each show a quarter of a further preferred screw profile of a screw element according to the invention, which is made up in each case of 8 circular arcs. In FIGS. 5*a* to 5*d* the outer screw radius amounts in each case to RA=0.54. The radius R_1 is equal to 0.95 in each of the four figures and the maximum dimensionless distance from the outer screw radius is calculated in each case as 0.0075. The tip zone is provided in the four figures by the circular arc 3, which lies in each case on the outer screw radius. The tip angle $\alpha\_3$ varies between 0.0461 and 0.1458. The grooved zone is provided in each of the four figures by the circular arc 3', which in each case lies on the core radius. The groove angle $\alpha\_3$ varies between 0.0461 and 0.1458. The sum of the tip angles of all the tip zones for a pair of screw elements according to the invention varies for FIGS. 5*a* to 5*d* between $8*0.0461=0.3688$ and $8*0.1458=1.1664$ and thus amounts only to approx. 0.116 to 0.366 times the sum of the tip angles of a pair of screw elements with a double-flighted Erdmenger screw profile. Half of a zone, which consists of flank zones and grooved zones, is provided by the circular arcs 4, 4', 3', 2' and F. Twice the sum of the associated flank and groove angles amounts to between 2.3456 and 2.4626 and is in each case greater than $2*\pi/3$.

In FIG. 5*a* the tip zone begins and ends with a kink, i.e. the circular arcs 2 and 4 in each case have the radius 0. In FIG. 5*b* the tip zone begins with a rounded portion and ends with a kink, i.e. the circular arc 2 has a radius greater than 0 and the circular arc 4 has the radius 0. In FIG. 5c the tip zone begins with a kink and ends with a rounded portion, i.e. the circular arc 2 has the radius 0 and the circular arc 4 has a radius greater than 0. In FIG. 5d the tip zone begins and ends with a rounded portion, i.e. the circular arcs 2 and 4 in each case have a radius greater than 0.

Through rotation by 1× or a multiple of $\pi/2$ and/or by mirroring at the x and/or y axis, FIGS. 5a to 5d may be combined into further preferred screw profiles of screw elements according to the invention. It is thus possible, for example, to generate a screw profile of screw elements according to the invention whose tip zones are of different sizes. It is thus additionally possible, for example, to generate a screw profile of screw elements according to the invention whose tip zones are rounded in the direction of rotation of the screw element or which are rounded contrary to the direction of rotation of the screw elements.

A process is explained below for generating smooth, closely intermeshing, self-cleaning and co-rotating screw profiles with the number of flights z, using the portion of a screw profile in FIG. 5d by way of example.

The screw profile and thus also the portion shown of the screw profile are in one plane according to the invention. For the sake of simplicity, this plane is placed in the xy plane of a Cartesian system of coordinates. Also for the sake of simplicity, the point of rotation of the screw profile is placed at the origin of the Cartesian system of coordinates (x=0, y=0).

The number of flights z is selected according to the invention such that z is greater than or equal to 1. In the present example the number of flights is selected to be z=2. The number of circular arcs n of the screw profile is selected such that n is a whole multiple p of 4*z. In the present example the number of circular arcs is selected to be n=32, resulting in p=4. The dimensionless outer screw radius RA of the screw profile is selected such that it is greater than 0 and less than or equal to the dimensionless centreline distance A. In the present example the dimensionless outer screw radius of the screw profile is selected to be RA=0.54. The dimensionless core radius RI of the screw profile is selected such that it is greater than or equal 0 and less than or equal to the dimensionless outer screw radius RA. In the present example the dimensionless core radius of the screw profile is selected to be RI=A–RA=0.46.

The circular arcs of the screw profile may be arranged clockwise or counterclockwise about the axis of rotation of the screw profile. In the present example the circular arcs are arranged counterclockwise about the axis of rotation of the screw profile.

The screw profile is divided into 2*z portions, which are characterized in that each portion is defined by two straight lines, which mutually form an angle in radians of $\pi/z$ and which intersect at the point of rotation of the screw profile, wherein these two straight lines are denoted portion boundaries. In the present example the screw profile is subdivided into four portions. For the sake of simplicity all the portion boundaries are placed on the x and y axes of the system of coordinates. In the present example the only portion of the screw profile taken into consideration hereinafter is the one which lies in the positive x and y directions.

The portion of the screw profile is subdivided into a first and a second part, wherein the first part consists of p circular arcs and the second part of p' circular arcs, wherein p'=p. In the present example p'=4. The circular arcs of the first part of the portion of the screw profile may be numbered in ascending or descending order. The circular arcs of the second part of the portion of the screw profile are numbered in reverse order from the circular arcs of the first part of the portion of the screw profile. In the present example the circular arcs of the first part of the portion of the screw profile are numbered in ascending order, the circular arcs of the second part of the portion of the screw profile accordingly being numbered in descending order.

The angle $\alpha\_1$ of the 1st circular arc of the first part of the portion of the screw profile is selected such that in radians it is greater than or equal to 0 and less than or equal to $\pi/(2*z)$. In the present example the angle of the 1st circular arc is selected to be $\alpha\_1=0.1222$. The dimensionless radius R_1 of the 1st circular arc of the first part of the portion of the screw profile is selected such that it is greater than or equal to 0 and less than or equal to the centreline distance A. In the present example the dimensionless radius of the 1st circular arc is selected to be R_1=0.9500. The position of the 1st circular arc of the first part of the portion of the screw profile is selected such that the 1st circular arc lies within or on the boundaries of a circular ring with the dimensionless outer screw radius RA and the dimensionless core radius RI, the centre point of which lies on the point of rotation of the screw profile. The position is preferably established by the positioning of the starting point and the centre point of the 1st circular arc. The starting point and centre point of the 1st circular arc are located on one of the portion boundaries, whereby the starting point is obtained from the position of the centre point and of the dimensionless radius R_1. In the present example the centre point of the 1st circular arc is placed on the coordinate Mx_1=–0.4175, My_1=0.0000 and the starting point thus lies on the coordinate x=0.5325, y=0.0000.

The angle $\alpha\_2, \ldots, \alpha\_(p-1)$ of p–2 further circular arcs, i.e. of 2 further circular arcs of the first part of the portion of the screw profile, are selected such that in radians they are greater than or equal to 0 and less than or equal to $\pi/(2*z)$. In the present example the angles of the 2 further circular arcs are selected to be $\alpha\_2=0.1712$ and $\alpha\_3=0.0461$. The dimensionless radii R_2, . . . , R_(p–1) of the 2 further circular arcs of the first part of the portion of the screw profile are selected such that they are greater than or equal to 0 and less than or equal to the dimensionless centreline distance A. In the present example the dimensionless radii of the 2 further circular arcs are selected to be R_2=0.2414 and R_3=0.5400. According to the rules of arrangement, the circular arcs are arranged such that the circular arcs merge tangentially into one another in such a way that a continuous, convex screw profile is obtained, wherein a circular arc, whose dimensionless radius is equal to 0, is preferably treated as a circular arc whose radius is equal to eps, wherein eps is a very small positive real number which tends towards 0 (eps<<1, eps→0). It follows from this rule of arrangement that the end point of a circular arc is equal to the starting point of the following circular arc. The required tangential transition between a first circular arc and a second, subsequent circular arc is met in that the centre point of this second, subsequent circular arc is placed in such a way on the straight line resulting from the end point and the centre point of this first circular arc that the distance of the centre point of this second, subsequent circular arc from the end point of this first circular arc is equal to the radius of this second, subsequent circular arc and the screw profile is convex. A circular arc whose radius is equal to 0 is preferably treated as a circular arc with a very small radius eps, wherein eps tends towards 0, such that the tangential transition may additionally be designed. As an alternative, a circular arc whose radius is equal to 0 may be treated such that the screw profile comprises a kink at the position of this circular arc, wherein the magnitude of the kink is established by the angle of this circular arc. In the present example the following positions of the centre points of the 2 further circular arcs result from the above-described rule of arrangement: Mx_2=0.2859, My_2=0.0864 and Mx_3=0.0000, My_3=0.0000. The 3rd circular arc lies on the dimensionless outer screw radius RA and the rule of arrangement that at least one circular arc touches the dimensionless outer screw radius RA is fulfilled.

The angle $\alpha\_4$ of the last circular arc of the first part of the portion of the screw profile is obtained according to the invention from the fact that the sum of the angles of the 4 circular arcs of the first part of the portion of the screw profile in radians is equal to $\pi/(2*z)$, wherein the angle $\alpha\_4$ in radians is greater than or equal to 0 and less than or equal to $\pi/(2*z)$. In the present example the angle of this last circular arc is $\alpha\_4=0.4459$. The dimensionless radius R_4 of the last circular arc of the first part of the portion of the screw profile results according to the invention from the fact that the end point of this last circular arc is tangent to a straight line FP at one point, wherein the straight line FP is perpendicular to the bisector of the two portion boundaries of this portion and is at a distance from the point of rotation of the screw profile in the direction of this portion which is equal to half the centreline distance, wherein the bisector passes, like the portion boundaries, through the point of rotation of the screw profile. The straight line FP is drawn in FIG. 5d as a dotted line. The 4th circular arc of the first part of the portion of the screw profile is designed by placing a tangent to the 3rd circular arc at the end point of the 3rd circular arc, the point of intersection of the tangent with the straight line FP being the centre point of a circle whose radius is equal to the length of the distance between the end point of the 3rd circular arc and the point of intersection of the tangent with the straight line FP, and in that the point of intersection, placed in the direction of the selected clockwise direction, of the circle with the straight line FP is the sought contact point of the end point of the 4th circular arc with the straight line FP. At the end point of the 4th circular arc, a perpendicular is dropped to the straight line FP. The point of intersection of this perpendicular with the straight line which is provided by the end point and the centre point of the 3rd circular arc is the centre point of the 4th circular arc. In the present example the position of the centre point of the 4th circular arc is calculated as Mx_4=3858, My_4=0.1362 and the dimensionless radius of the 4th circular arc is established as R_4=0.1309.

The angles ($\alpha\_p'$, ..., $\alpha\_1'$) of the second part of the portion of the screw profile are determined in that the angle $\alpha\_j'$ of the j'th circular arc of the second part of the portion is equal to the angle $\alpha\_j$ of the jth circular arc of the first part of the portion, wherein j and j' are integers which pass jointly through all the values in the range from 1 to the number of circular arcs p or p' respectively ($\alpha\_1'=\alpha\_1, \ldots, \alpha\_p'=\alpha\_p$). In the present example the angles of the second part of the portion are calculated as $\alpha\_1'=\alpha\_1=0.1222$, $\alpha\_2'=\alpha\_2=0.1712$, $\alpha\_3'=\alpha\_3=0.0461$ and $\alpha\_4'=\alpha\_4=0.4459$.

The dimensionless radii R_p', ..., R_1' of the second part of the portion of the screw profile are determined in that the sum of the dimensionless radius R_j' of the j'th circular arc of the second part of a portion and of the dimensionless radius R_j of the jth circular arc of the first part of a portion is equal to the dimensionless centreline distance A, wherein j and j' are integers which pass jointly through all the values in the range from 1 to the number of circular arcs p or p' respectively (R_1'+R_1=A=1, R_p'+R_p=A=1). In the present example the dimensionless radii of the second part of the portion are calculated as R_1'=A-R_1=0.0500, R_2'=A-R_2=0.7586, R_3'=A-R_3=0.4600 and R4'=A-R_4=0.8691.

The position of the circular arcs of the second part of the portion of the screw profile is obtained according to the invention in that the circular arcs merge tangentially with one another and the screw profile is convex. In the present example the following coordinates are obtained for centre points of the 4 circular arcs of the second part of the portion of the screw profile: Mx_1'=0.0000, My_1'=0.4175, Mx_2'=-0.0864, My_2'=-0.2859, Mx_3'=0.0000, My_3'=0.0000 and Mx_4'=-0.1362, My_4'=-0.3858. The 3rd circular arc of the second part of the portion of the screw profile lies on the dimensionless core radius RI and the rule of arrangement that at least one circular arc touches the dimensionless core radius RI is fulfilled.

FIG. 6: FIGS. 6a to 6c each show a quarter of a further preferred screw profile of a screw element according to the invention, which is made up in each case of 8 circular arcs. In FIG. 6a the outer screw radius RA=0.58, while in FIG. 6b RA=0.56 and in FIG. 6c RA=0.52. The maximum dimensionless distance of the circular arc 1 from the outer screw radius varies in FIGS. 6a to 6c between 0.006 and 0.02. The tip zone is provided in the three figures by the circular arc 3, which lies in each case on the outer screw radius. The tip angle $\alpha\_3$ varies between 0.0270 and 0.0698. The grooved zone is provided in each of the four figures by the circular arc 3', which in each case lies on the core radius. The groove angle $\alpha\_3$ varies between 0.0270 and 0.0698. The sum of the tip angles of all the tip zones for a pair of screw elements according to the invention varies for FIGS. 6a to 6c between 8*0.0270=0.2160 (RA=0.58) and 8*0.0698=0.5584 (RA=0.56) and thus amounts only to approx. 0.106 times (RA=0.58) to 0.219 times (RS=0.56) the sum of the tip angles of a pair of screw elements with a double-flighted Erdmenger screw profile with a corresponding outer screw radius. Half of a zone, which consists of flank zones and grooved zones, is provided by the circular arcs 4, 4', 3', 2' and F. Twice the sum of the associated flank and groove angles amounts to between 2.1272 (RA=0.52) and 2.6338 (RA=0.58) and is in each case greater than $2*\pi/3$.

FIG. 7: FIG. 7 shows a section perpendicular to the axes of rotation of a preferred pair of screw elements according to the invention with asymmetric screw profiles. The screw barrel, which is obtained from two mutually interpenetrating bores with in each case the radius RA=0.54 and the distance A=1, is illustrated by a thin, dashed line. Where the two barrel bores interpenetrate, the two bores are distinguished by thin, dotted lines. The centre points of the two barrel bores are identical to the two points of rotation of the screw profiles and are distinguished in each case by a small circle. The in each case 32 circular arcs of the two screw profiles are distinguished by a thick, continuous line. The circular arcs of the left-hand screw profile, of the generating screw profile, are consecutively numbered (1-16), wherein for reasons of clarity the numbers of circular arcs 17 to 32 are omitted. The circular arcs of the right-hand screw profile, of the generated screw profile, are consecutively numbered (1'-16'), wherein for reasons of clarity the numbers of circular arcs 17' to 32' are omitted. The centre points of the in each case first 16 circular arcs are illustrated by small circles. The centre points of these in each case first 16 circular arcs are connected by thin, continuous lines both with the starting point and with the end point of the associated circular arc. Below the figure, the radius R, the angle $\alpha$ and the x and y coordinates of the circular arc centre point Mx and My are stated for each circular arc in each case to four significant digits. These details unambiguously define the screw profile.

Despite reducing the circular arcs described in detail to 16 per screw profile, as a result of generation of the figures by means of computer software, the numbers of the circular arcs may overlap in part, see for example circular arcs 6 and 7 and circular arcs 14' and 15'. Despite the sometimes poor legibility of individual numbers, the structure of the profiles is nevertheless clear from the context in conjunction with this description.

The generating screw profile consists of 4 tip zones. The tip zones of the generating screw profile consist of the circular arcs 1, 12, 17 and 28. The flank zone between the two tip zones belonging to the circular arcs 1 and 28 is larger than the flank zone between the two tip zones belonging to the circular arcs 12 and 17. The generated screw profile consists of the 4 grooved zones, which correspond with the 4 tip zones of the generating screw profile. The grooved zones of the generated screw profile consist of the circular arcs 1', 12', 17' and 28'.

The generating screw profile consists of 4 grooved zones. The generated screw profile consists of the 4 tip zones, which correspond with the 4 grooved zones of the generating screw profile. The grooved zones of the generating screw profile consist of the circular arcs 4, 9, 20 and 25. The tip zones of the generated screw profile consist of the circular arcs 4', 9', 20' and 25'.

In total the number of tip zones of the pair of screw elements according to the invention shown in FIG. 7 is 8 and according to the invention is greater than 4. The sum of the tip angles of all the tip zones amounts to 4*0.0419+ 4*0.1450=0.7476 and thus only to approx. 0.235 times the sum of the tip angles of a pair of screw elements with a double-flighted Erdmenger screw profile with a corresponding outer screw radius.

A first zone of the generating screw profile, which consists of flank zones and grooved zones and in which the sum of the flank and groove angles is greater than π/2, preferably greater than 2*π/3, consists of the circular arcs 2 to 11. The sum of the flank and groove angles amounts to 2.3456 and is greater than 2*π/3. A second zone of the generating screw profile, which consists of flank zones and grooved zones and in which the sum of the flank and groove angles is greater than π/2, preferably greater than 2*π/3, consists of the circular arcs 18 to 27. The sum of the flank and groove angles amounts to 2.3456 and is greater than 2*π/3.

A first zone of the generated screw profile, which consists of flank zones and grooved zones and in which the sum of the flank and groove angles is greater than π/2, preferably greater than 2*π/3, consists of the circular arcs 10' to 19'. The sum of the flank and groove angles amounts to 2.1709 and is greater than 2*π/3. A second zone of the generated screw profile, which consists of flank zones and grooved zones and in which the sum of the flank and groove angles is greater than π/2, preferably greater than 2*π/3, consists of the circular arcs 26' to 32' and 1' to 3'. The sum of the flank and groove angles amounts to 2.5199 and is greater than 2*π/3.

A screw profile of a screw element according to the invention may clearly be obtained according to FIG. 7 inter alia in the following way: the flank zone and grooved zone of a first quarter of a (symmetrical) screw profile is mirrored at the y axis. The flank zone and grooved zone of a second quarter of a (symmetrical) screw profile is mirrored at the y axis and in the range from π to π−[π/2−2*arccos(0.5*A/ RA)] is rotated clockwise or counterclockwise about the point of rotation of the screw profile. The term in the square brackets is equal to the tip angle of a screw element with a double-flighted Erdmenger screw profile. In FIG. 7 a flank zone and grooved zone of a first quarter according to FIG. 4b is selected. The circular arcs 2, 3, 4, 5 and 6 of FIG. 7 correspond to the circular arcs 4, 4', 3', 2' and 1' of FIG. 4b. The flank zone and grooved zone of a second quarter is based on FIG. 2a. The circular arcs 18, 19, 20, 21 and 22 correspond to the circular arcs 4, 4', 3', 2' and 1' of FIG. 2a. The zones between the two flank zones and grooved zones are completed by a tip zone or by a sequence of tip and flank zones, preferably by a sequence of tip zone-flank zone-tip zone, in such a way that a continuous screw profile is obtained. Such zones are hereinafter known as closing zones. The angle between the starting and end points of a closing zone relative to the point of rotation of the screw profile is known as the closing angle.

In FIG. 7 a first closing zone, consisting of tip and flank zones, consists of circular arcs 12, 13, 14, 15, 16 and 17. A second closing zone consists of circular arcs 28, 29, 30, 31, 32 and 1. Rotating a second quarter of a screw profile by more or less than π results in the two closing zones between the two zones consisting of flank zones and grooved zones being unequal in size. Rotation proceeds about an angle, such that the closing angle of one of the two closing zones is preferably greater than the 1.2 times, particularly preferably greater than 1.6 times the tip angle of a double-flighted Erdmenger screw profile with a corresponding outer screw radius and most preferably greater than the barrel opening angle, which is calculated by 2*arccos(0.5*A/RA). In these cases the second of the two closing zones particularly preferably consists of a tip zone, whereby this screw profile consists of a total of 3 tip zones.

Figure 8A:
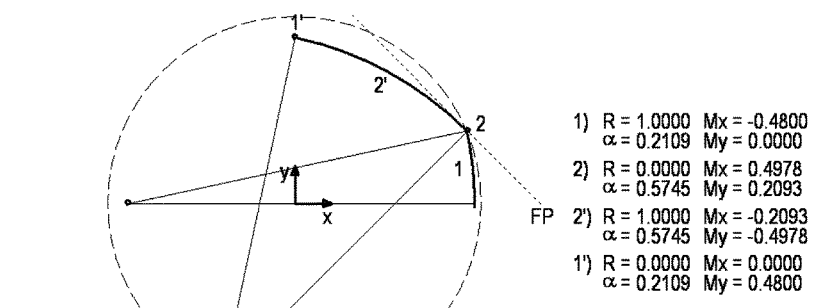
FIGS. 8a and 8b each show a quarter of a preferred screw profile of a screw element according to the invention, which is made up in each case of 4 circular arcs FIGS. 9a and 9b each show a quarter of a preferred screw profile of a screw element according to the invention, which is made up in each case of 4 circular arcs.
Figure 8B:
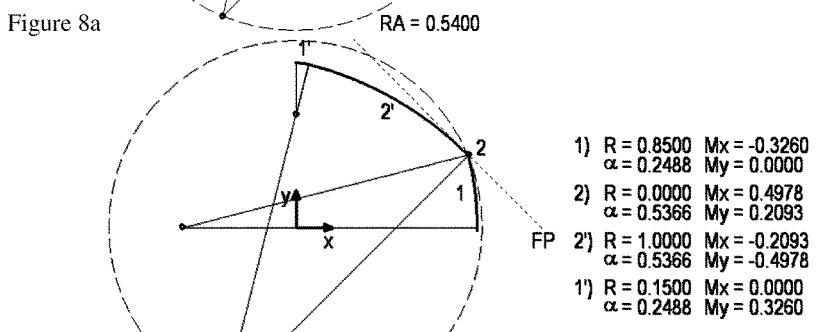

FIG. 8: FIGS. 8a and 8b each show a quarter of a preferred screw profile of a screw element according to the invention, which is made up in each case of 4 circular arcs. In both figures the outer screw radius amounts to RA=0.54. The maximum dimensionless distance between the circular arc 1 and the outer screw radius is calculated in FIG. 8a as 0.02 and in FIG. 8b as 0.016. The tip zone is provided in both figures by the circular arc 2, which lies in each case on the outer screw radius. The tip angle $\alpha\_2$ is in each case equal to 0. The grooved zone is provided in each case by the contact point of the circular arc 2' with the core radius. The contact point is equal to the point of intersection of the circular arc 2' with a straight line, which is determined by the centre point of the circular arc 2' and the point of rotation of the screw profile (coordinate origin). The groove angle is in each case equal to 0. The sum of the tip angles of all the tip zones for a pair of screw elements according to the invention amounts for FIGS. 8a and 8b in each case to 0.

Half of a zone, which consists of flank zones and grooved zones, is provided in each case by the circular arcs 2, 2' and 1'. Such zones are hereinafter known as channel zones. The angle between the starting and end points of a channel zone relative to the point of rotation of the screw profile is known as the channel angle. Half of a closing zone is provided by circular arcs 1 and 2.

Circular arc 2 belongs both to the closing zone and to the channel zone. Division of the angle of the circular arc 2 into the closing zone and the channel zone proceeds in that the circular arc 2 is imagined as a circular arc with radius EPS (EPS<<1, EPS→0) and this circular arc intersects with a straight line which is provided by the centre point of the circular arc 2 and the point of rotation of the screw profile. The part of the circular arc 2, and thus the part of the angle of the circular arc 2 which lies under the point of intersection, belongs to the closing zone, the other part belonging to the channel zone. The straight line which passes through the centre point of the circular arc 2 and through the point of rotation of the screw profile has in both figures in each case the lead angle arctan(My_2/Mx_2)=0.3980. The sum angle of the entire channel zone amounts in each case to π−2*lead angle=2.3456 and is in each case greater than 2*π/3.

A characteristic feature of FIGS. 8a and 8b is that the tip zone and the grooved zone are provided in each case by a point on the outer screw radius or the core radius. At the point of contact with the outer screw radius, the screw profiles comprise a kink, i.e. the circular arc 2 in each case has the radius 0.

Figure 9A:
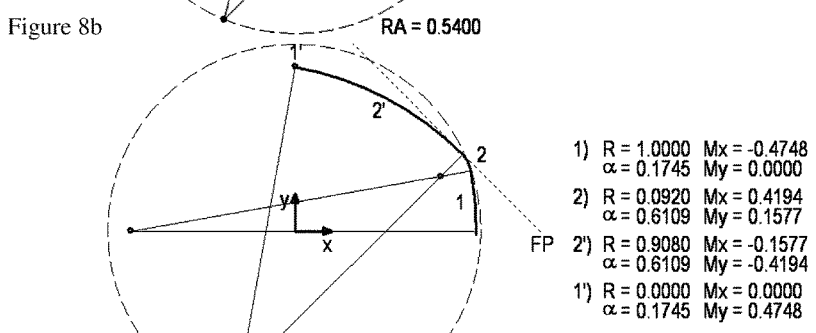
Figure 9B:
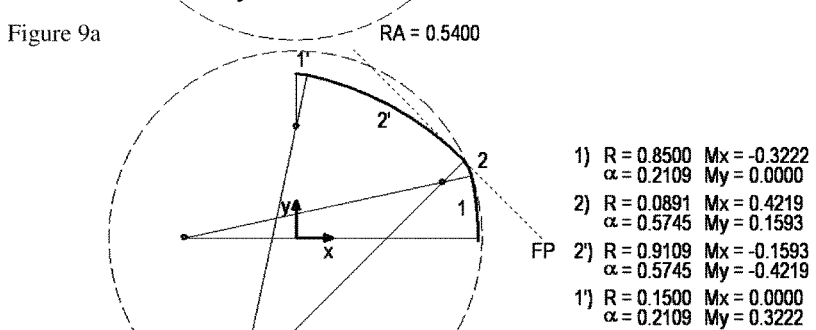

FIG. 9: FIGS. 9a and 9b each show a quarter of a further preferred screw profile of a screw element according to the invention, which is made up in each case of 4 circular arcs. In both figures the outer screw radius amounts to RA=0.54. The maximum dimensionless distance between the circular arc 1 and the outer screw radius is calculated in FIG. 9a as 0.0148 and in FIG. 9b as 0.0122. The tip zone is provided in both figures by the circular arc 2, which lies in each case on the outer screw radius. The contact point is equal to the point of intersection of the circular arc 2 with a straight line, which is determined by the centre point of the circular arc 2 and the point of rotation of the screw profile (coordinate origin). The tip angle is in each case equal to 0. The grooved zone is provided in each case by the contact point of the circular arc 2' with the core radius. The contact point is equal to the point of intersection of the circular arc 2' with a straight line, which is determined by the centre point of the circular arc 2' and the point of rotation of the screw profile (coordinate origin). The groove angle is in each case equal to 0. The sum of the tip angles of all the tip zones for a pair of screw elements according to the invention amounts for FIGS. 9a and 9b in each case to 0.

Half of a channel zone is provided in each case by part of the circular arc 2 and the circular arcs 2' and F. The straight line which passes through the centre point of the circular arc 2 and through the point of rotation of the screw profile has in FIG. 9a the lead angle arctan(My_2/Mx_2)=0.3597 and in FIG. 9b the lead angle 0.3610. The sum angle of the entire channel zone amounts in FIG. 9a to π−2*lead angle=2.4223 and in FIGS. 9b to 2.4195 and is in each case greater than 2*π/3.

A characteristic feature of FIGS. 9a and 9b is that the tip zone and the grooved zone are provided in each case by a point on the outer screw radius or the core radius. At the point of contact with the outer screw radius, the screw profiles do not comprise a kink, i.e. the circular arc 2 in each case has a radius greater than 0. The circular arc 2 is thus at a tangent to the outer screw radius.

FIG. 10: FIGS. 10a and 10b show further preferred screw profiles of screw elements according to the invention, of which the sum of the tip angles of all the tip zones is equal to 0. The figures are constructed as in FIG. 7, where a detailed explanation has already been provided. The outer screw radius amounts in FIG. 10a to RA=0.54 and in FIG. 10b to RA=0.63.

The tip zones of the left-hand screw profile, the generating screw profile, consist in each case of the circular arcs 2, 7, 10 and 15. The tip zones of the right-hand screw profile, the generated screw profile, consist of the circular arcs 3', 6', 11' and 14'. FIG. 10b shows the peculiar feature that the circular arcs 3' to 6' and 11' to 14' coincide and the generated screw profile comprises only two tip zones and the pair of screw elements comprises overall only six tip zones.

A first channel zone of the generating screw profile is provided in each case by the circular arcs 2, 3, 4, 5, 6 and 7. A second channel zone of the generating screw profile is provided in each case by the circular arcs 10, 11, 12, 13, 14 and 15. A first closing zone between the two channel zones of the generating screw profile is provided by the circular arcs 7, 8, 9 and 10. A second closing zone between the two channel zones of the generating screw profile is provided by the circular arcs 15, 16, 1 and 2.

The circular arcs 2, 7, 10 and 15 belong in each case both to the channel zone and to the closing zone. Subdivision of the angle of these circular arcs into the channel and closing zones has already been explained in FIG. 8. The closing angles of the two closing zones of the generating screw profile amount in FIG. 10a in each case to 0.9600. The closing angle of the closing zone thus amounts to approx. 1.206 times the tip angle of a double-flighted Erdmenger screw profile with a corresponding outer screw radius. The closing angles of the two closing zones of the generating screw profile amount in FIG. 10b in each case to 0.5257. The closing angle of the closing zone thus amounts to approx. 2.000 times the tip angle of a double-flighted Erdmenger screw profile with a corresponding outer screw radius.

The two closing angles of the closing zones of a screw profile of a pair of screw elements according to the invention are preferably in each case greater than 1.2 times, particularly preferably in each case greater than 1.6 times the tip angle of a double-flighted Erdmenger screw profile with a corresponding outer screw radius. In these cases the closing zones of the corresponding screw profile preferably consist of a tip zone.

The figures show screw profiles with a screw radius of 0.52, 0.54, 0.56, 0.58 and 0.63. The outer screw radius is in no way limited to the values shown. Instead, the screw radius is preferably in the range from 0.51 to 0.66 and particularly preferably in the range from 0.52 to 0.575.

The figures show screw profiles in which a quarter of a screw profile consists of 4 or 8 circular arcs or in which a complete screw profile consists of 16 or 32 circular arcs. The number of circular arcs is in no way limited to the values shown. Instead, a quarter of a screw profile consists of at least 2 circular arcs and a complete screw profile of at least 6 circular arcs. There is no upper limit to the number of circular arcs of which a screw profile or a part of a screw profile consists.

It has surprisingly been found that screw profiles of a pair of screw elements according to the invention may be generated by a defined sequence of tip zones, flank zones and grooved zones. The present invention therefore provides novel screw elements for multi-screw extruders, characterized in that a generating and a generated screw profile display a sequence of channel zone-closing zone-channel zone-closing zone. Channel zone is understood to mean a sequence of flank zones and grooved zones, preferably a sequence of flank zone-grooved zone-flank zone-grooved zone-flank zone, particularly preferably a sequence of flank zone-grooved zone-flank zone. Closing zone is understood to mean a tip zone or preferably a sequence of tip and flank zones, particularly preferably a sequence of tip zone-flank zone-tip zone.

All the screw profiles shown in the figures may be subdivided into a sequence of channel zone-closing zone-channel zone-closing zone.

FIGS. 11 to 13 show the generating screw profile 100 and generated screw profile 102 inside a figure-of-eight-shaped screw barrel 104. Inside the two screw profiles 100, 102, numerical values are given for the following screw variables:

RG: radius of the two barrel bores

RV: virtual barrel radius, which is less than or equal to the barrel radius RG

RA: outer screw radius of the closely intermeshing, self-cleaning screw profiles RF: outer screw radius of the screw profiles to be manufactured S: clearance between the two screw profiles to be manufactured D: clearance between the screw profiles to be manufactured and the barrel T: pitch of a conveying, mixing or transition element VPR: magnitude of the displacement of the smooth, closely intermeshing, self-cleaning screw profiles, if they are arranged eccentrically VPW: angle of displacement (indication of direction) of the smooth, closely intermeshing, self-cleaning screw profiles, if they are arranged eccentrically VLR: magnitude of the displacement of the screw profile to be manufactured of the left-hand screw within the clearances VLW: angle of displacement of the screw profile to be manufactured of the left-hand screw within the clearances VRR: magnitude of the displacement of the screw profile to be manufactured of the right-hand screw within the clearances VRW: angle of displacement of the screw profile to be manufactured of the right-hand screw within the clearances.

The screw barrel 104, which is obtained from two mutually interpenetrating bores with in each case the radius RG and the distance A=1, is illustrated by a thin, dashed line. Where the two barrel bores interpenetrate, the two bores are distinguished by thin, dotted lines. The centre points of the two barrel bores are identical to the two points of rotation of the screw profiles 100, 102 and are distinguished in each case by a small circle. The closely intermeshing, self-cleaning screw profiles 100, 102 are distinguished by a thick, continuous line. The screw profiles 100, 102 in manufacture are illustrated by a thin, continuous line.

It is known to a person skilled in the art that the following relationship applies between the outer screw radius RA of the closely intermeshing, self-cleaning screw profile, the virtual barrel radius RV, the clearance S between the two screw profiles 100, 102 to be manufactured and the clearance D between the screw profiles 100, 102 to be manufactured and the screw barrel: RA=RV−D+S/2.

It is further known to a person skilled in the art that the following relationship applies between the outer screw radius RF of the screw profile to be manufactured, the virtual barrel radius RV and the clearance D between the screw profiles 100, 102 to be manufactured and the screw barrel 104: RF=RV−D.

Typically the virtual barrel radius RV is equal to the stated barrel radius RG. If the virtual barrel radius RV is selected to be smaller than the barrel radius RG, an additional clearance arises between the screw profiles 100, 102 and the barrel 104. This clearance may be used to displace the generating and the generated screw profiles 100, 102 eccentrically while maintaining self-cleaning. The eccentricity is unambiguously characterized by the magnitude of the displacement VPR and the direction of displacement in the form of an angle VPW.

Figure 11A:
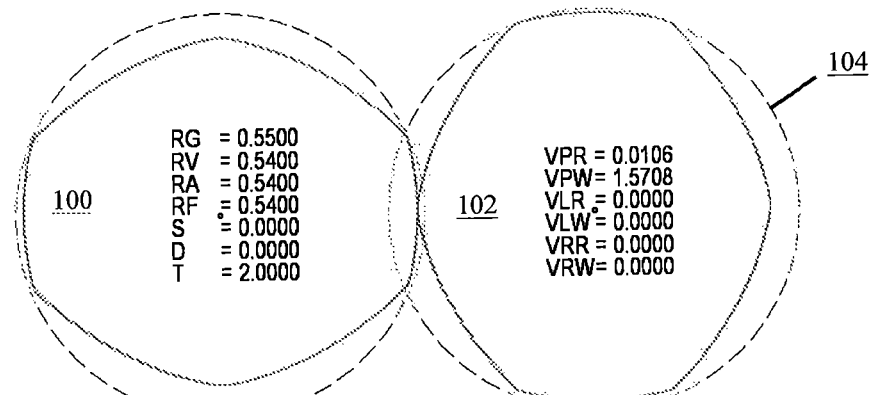
FIGS. 11a-11c show preferred embodiments of eccentric positioning of the screw profiles of screw elements.
Figure 11B:
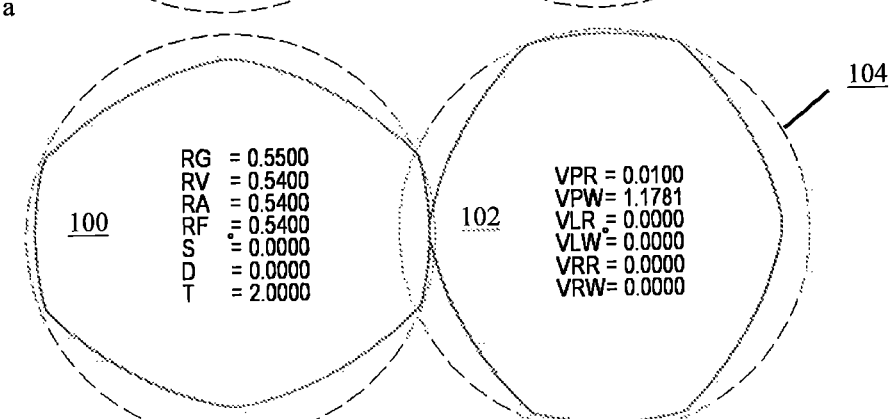
Figure 11C:
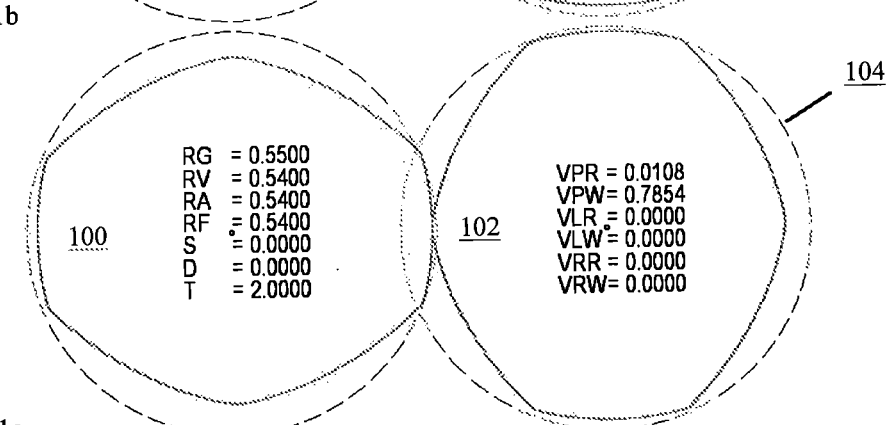
Figure 12A:
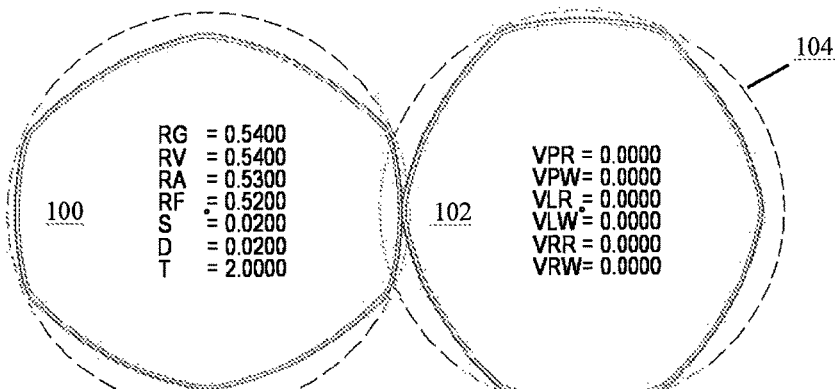
FIGS. 12a-12d show different clearance strategies.
Figure 12B:
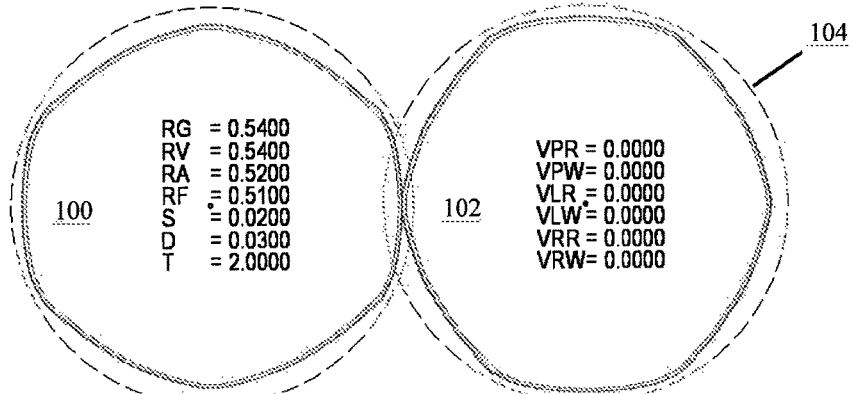
Figure 12C:
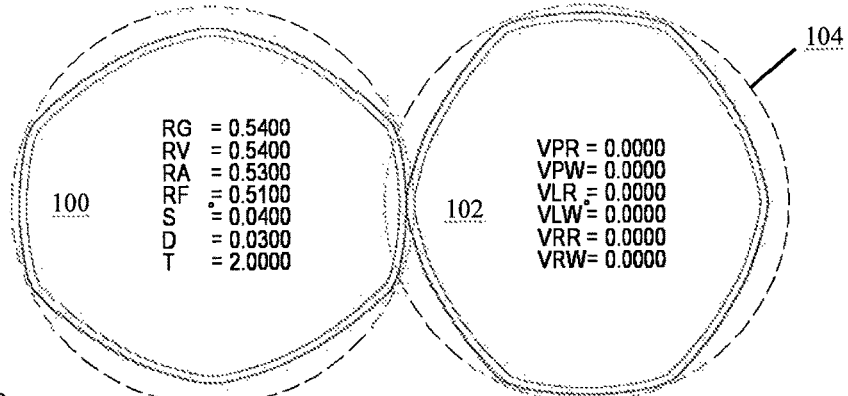
Figure 12D:
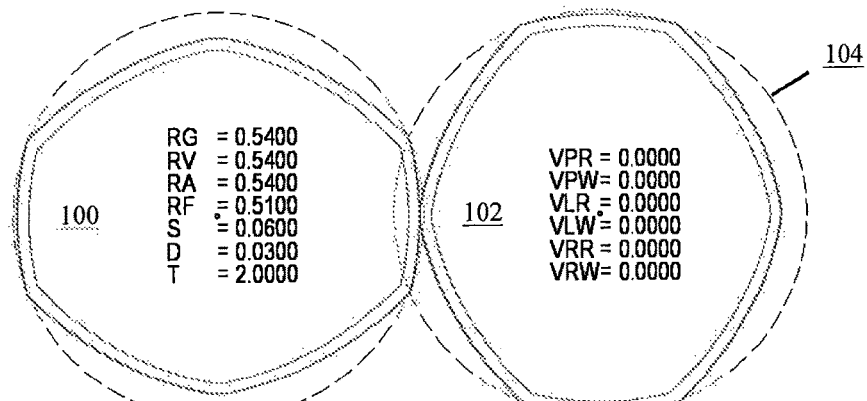
Figure 13A:
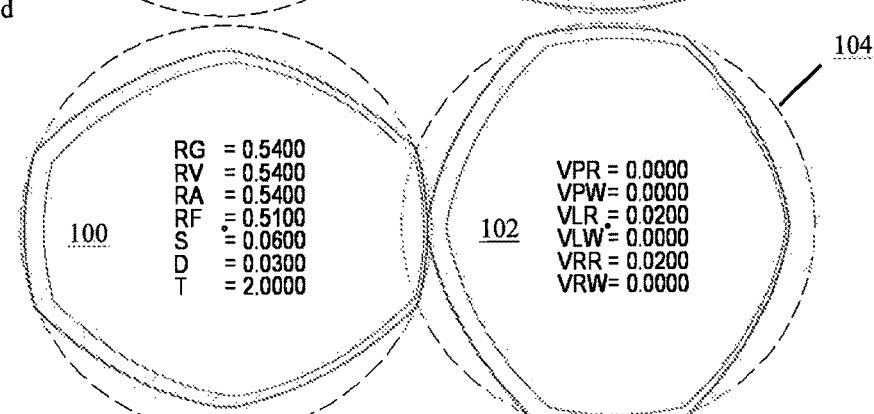
FIGS. 13a-13d show a selection of possible displacements.
Figure 13B:
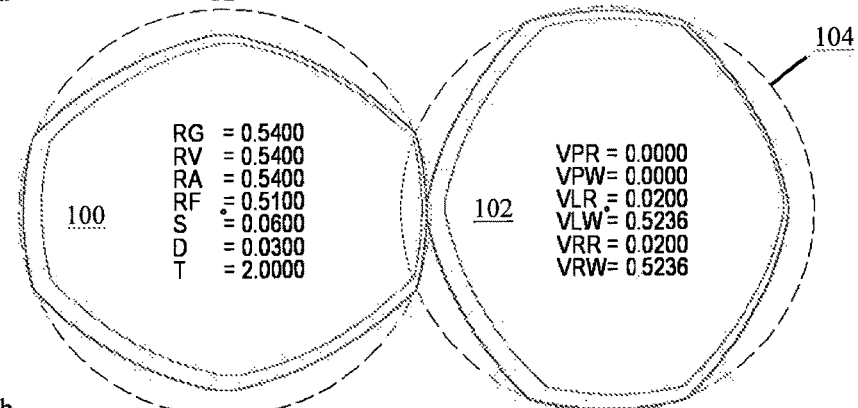
Figure 13C:
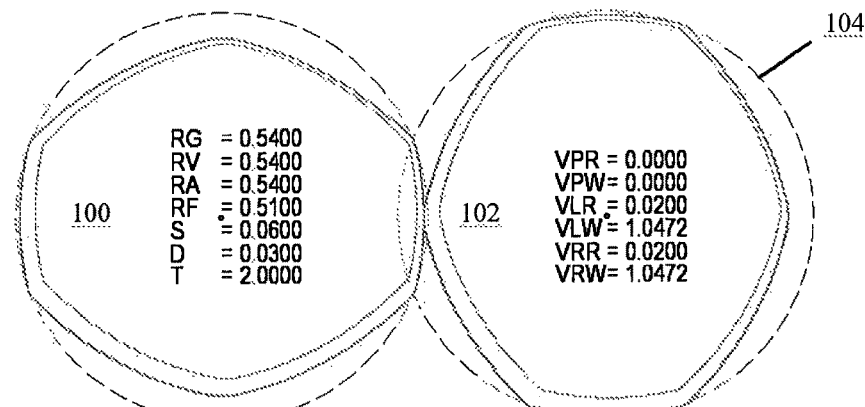
Figure 13D:
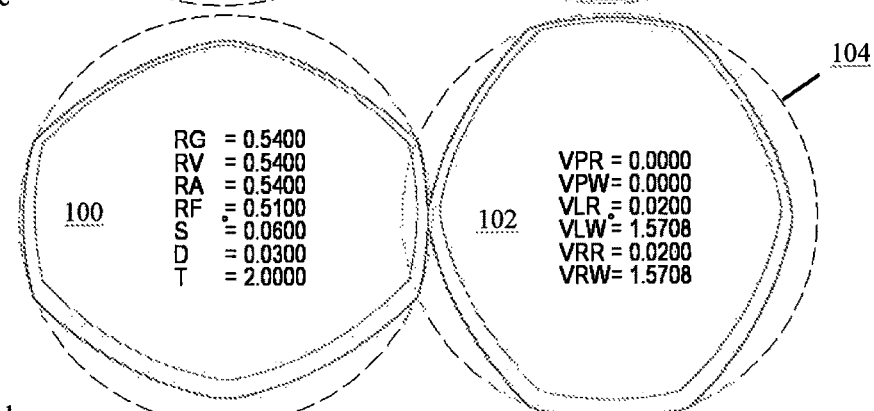

FIG. 11: FIGS. 11*a* to 11*c* show preferred embodiments of eccentric positioning of the screw profiles of screw elements according to the invention. The screw profile in FIGS. 11*a* to 11*c* is based on FIG. 2*a*. The virtual barrel radius amounts to RV=0.54 and is less than the barrel radius RG (RG=0.55). The further geometric parameters may be taken from the individual figures. The screw profiles have each been displaced to such an extent in FIGS. 11*a* to 11*b* that exactly one point of the right-hand screw profile and no point of the left-hand screw profile touches the barrel. The magnitude of the displacement needed for this purpose depends on the direction of displacement. FIG. 11*c* shows a special case, in which the screw profiles are displaced in magnitude and direction to such a degree that both screw profiles touch the barrel at precisely one point. The displacement here proceeds at an angle of $\pi/4$. Further eccentric positionings of the screw profiles may be selected, in which no point of the screw profiles touches the barrel.

FIG. 12: As is known to a person skilled in the art, in practice all screw elements need a degree of clearance, both relative to one another and relative to the barrel. FIGS. 12*a* to 12*d* show different clearance strategies. The geometric parameters may be taken from the individual figures. FIG. 12*a* shows a clearance strategy in which the clearance between the screw profiles to be manufactured and between the screw profiles to be manufactured and the barrel is of equal size. FIG. 12*b* shows a clearance strategy in which the clearance between the screw profiles to be manufactured is smaller than the clearance between the screw profiles to be manufactured and the barrel. FIG. 12*c* shows a clearance strategy in which the clearance between the screw profiles to be manufactured is larger than the clearance between the screw profiles to be manufactured and the barrel. FIG. 12*d* shows a further embodiment according to FIG. 12*c* with particularly large clearances. For the clearance between the screw profiles to be manufactured, typical clearances occurring in practice lie in the range from 0.002 to 0.1. For the clearance between the screw profiles to be manufactured and the barrel, typical clearances occurring in practice lie in the range from 0.002 to 0.1. Typical clearances occurring in practice are constant over the circumference of the screw profile. It is however admissible to vary both the clearance between the screw profiles to be manufactured and the clearance between the screw profiles to be manufactured and the barrel over the circumference of the screw profiles.

FIG. 13: It is additionally possible to displace the screw profiles to be manufactured within the clearances. FIGS. 13*a* to 13*d* show a selection of possible displacements. The geometric parameters may be taken from the individual figures. In FIGS. 13*a* to 13*d* the magnitude of the displacement for in each case both screw profiles to be manufactured amounts to VLR=VRR=0.02. In FIGS. 13*a* to 13*d* the direction of displacement for in each case both screw profiles to be manufactured varies stepwise between VLW=VRW=0 and VLW=VRW=$\pi/2$. It is admissible to displace the two screw profiles to be manufactured mutually independently in different directions and by different amounts.

Figure 14A:
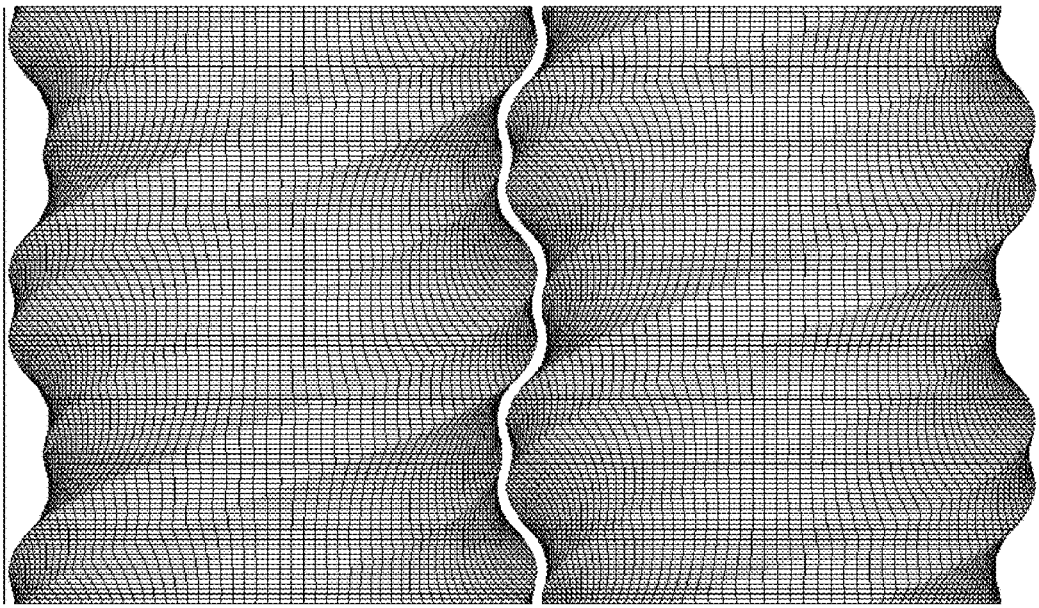

FIG. 14*a* shows by way of example a pair of screw elements according to the invention, configured as conveying elements, whose screw profile is based on FIG. 2*a*. The barrel radius amounts to RG=0.54. The clearance between the two conveying elements amounts to S=0.02. The clearance between the two conveying elements and the barrel amounts to D=0.01. The pitch of the conveying elements amounts to T=1.2. The length of the conveying elements amounts to 1.2, which corresponds to rotation of the screw profiles by an angle of 2π. The barrel is illustrated by thin, continuous lines to the left and right of the two conveying elements. A possible computational grid is further illustrated on the surfaces of the two conveying elements, which grid may be used for calculating flow in twin- and multi-screw extruders.

Figure 14B:
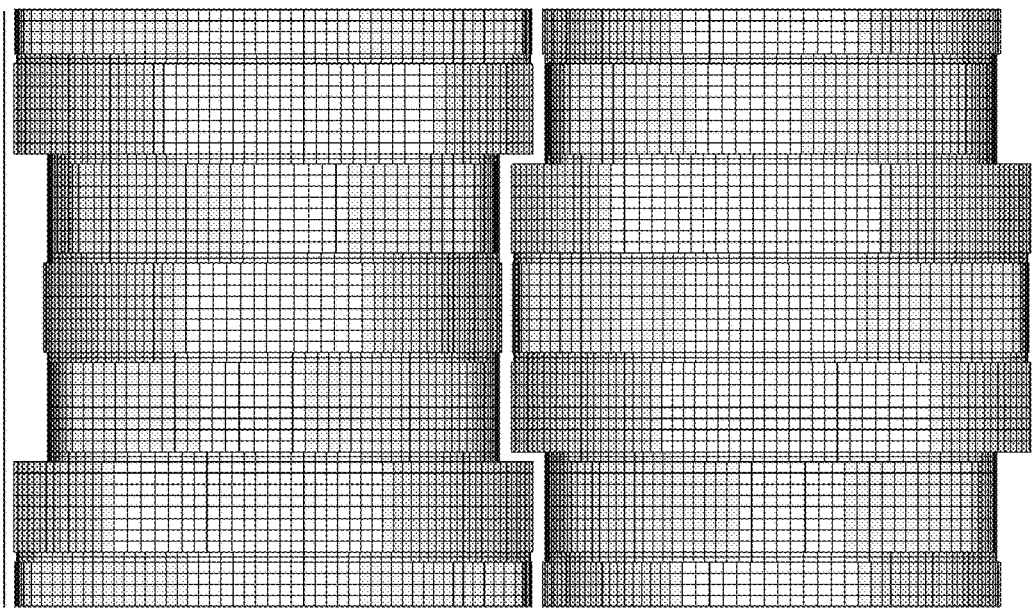

FIG. 14b shows by way of example a pair of screw elements according to the invention, configured as kneading elements, whose screw profile is based on FIG. 2a. The barrel radius amounts to RG=0.54. The clearance between the kneading discs of the two kneading elements amounts to S=0.02. The clearance between the kneading discs of the two kneading elements and the barrel amounts to D=0.01. The kneading element consists of 7 kneading discs, which are in each case offset right-handedly by an angle of π/6 relative to one another. The first and last kneading discs have a length of 0.09. The middle kneading discs have a length of 0.18. The groove between the kneading discs has a length of 0.02. The barrel is shown by thin, continuous lines to the left and right of the two kneading elements. A possible computational grid is further illustrated on the surfaces of the two kneading elements, which grid may be used for calculating flow in twin- and multi-screw extruders.

EXAMPLES

The pressure build-up capacity and power requirement of screw elements with a double-flighted Erdmenger screw profile according to the prior art and of screw elements according to the invention with novel screw profiles were calculated with the assistance of flow simulation.

As is known to a person skilled in the art and as is to be found in Kohlgrüber on pages 129 to 146, the operating behaviour of screw elements such as conveying, kneading and mixing elements may be described by a pressure differential/throughput and a power/throughput characteristic. To simplify transferability to different extruder sizes, the variables pressure differential, power and throughput are used in their dimensionless forms. In the case of a plastic composition with Newtonian flow behaviour there is a linear relationship both between pressure differential and throughput and between power and throughput. In the pressure difference/throughput characteristic, the intersection points of the axes are labelled A1 and A2 (Kohlgrüber, page 133). The operating point A1 denotes the inherent throughput of a screw element. The operating point A2 denotes the pressure build-up capacity without throughput. In the power/throughput characteristic the intersection points of the axes are labelled B1 and B2 (Kohlgrüber, page 136). Point B1 is the "turbine point". If the throughput is greater than B1, power is output to the screws. Operating point B2 denotes the power requirement without throughput.

In a pressure build-up zone only some of the power introduced may be converted into flow power. The remainder of the introduced power dissipates. Flow power is calculated as the product of throughput and pressure differential. As a person skilled in the art will readily recognize, the flow power at the intersection points A1 and A2 of the axes is in each case equal to 0, since either the pressure differential is equal to 0 (A1) or the throughput is equal to 0 (A2). In the zone between A1 and A2 both the pressure differential and the throughput are greater than 0, resulting in a positive flow power. If the flow power of an operating point provided by a throughput is divided by the power output by the screws at this operating point, the pressure build-up efficiency at this operating point is obtained. By deriving efficiency on the basis of throughput and subsequent root finding, the maximum efficiency of a screw element may be found.

The flow inside a pair of screw elements was carried out using the commercially available software package Fluent, version 6.3.26. An introduction to flow simulation of twin-screw extruders may be found for example in [1, pages 147-168].

Flow simulation was carried out in each case by investigating using screw elements whose length is equal half the pitch. During flow simulation, these screw elements were provided at their axial start and their axial end with periodic constraints, in order to calculate a hydrodynamically established flow state. A fluid with Newtonian flow behaviour was used as the plastic composition.

Example 1: Conveying Element with Double Flighted Erdmenger Screw Profile According to the Prior Art The geometry of the conveying element may be inferred from FIG. 1 and the descriptions relating to FIG. 1. In contrast to the computational grids shown in FIGS. 1b and 1c, a computational grid is used for flow simulation which in each direction comprises twice as many computational cells, i.e. 320 grid elements in the circumferential direction, 160 grid elements in the axial direction and 12 grid elements in the radial direction.

The axial portions were calculated as follows: A1=0.1365, A2=18917, B1=0.4273, B2=8084. Maximum efficiency during pressure build-up is determined as 9.59%.

Figure 15A:
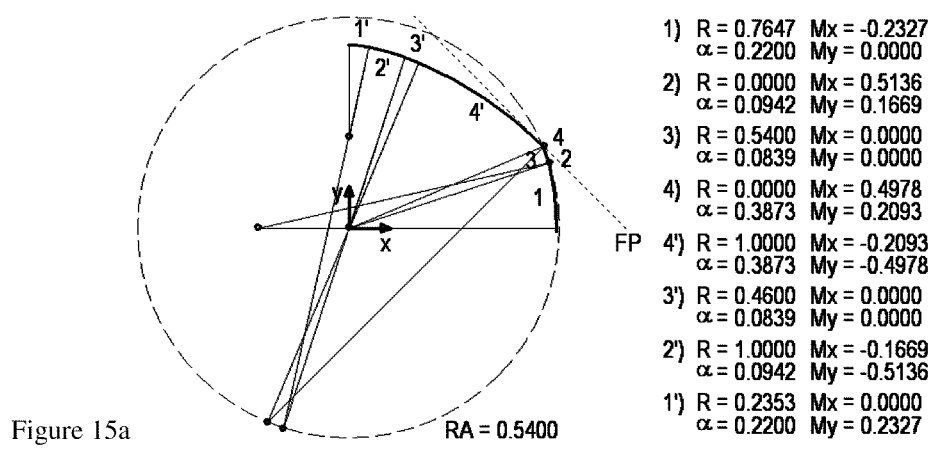
FIG. 15a shows a quarter of a preferred screw profile of a screw element according to the invention, which is made up of 8 circular arcs.

Example 2: Conveying Element According to the Invention with Novel Screw Profile The geometry of the conveying element according to the invention is clear from FIG. 15. FIG. 15a shows a quarter of a preferred screw profile of a screw element according to the invention, which is made up of 8 circular arcs. The dimensionless outer screw radius amounts to RA=0.54. The radius R_1 is equal to 0.7647. The maximum dimensionless distance of the circular arc 1 from the outer screw radius is calculated as 0.008. The tip zone is provided by the circular arc 3, which lies on the outer screw radius. The tip angle α_3 is equal to 0.0839. The grooved zone is determined by the circular arc 3', which lies on the core radius. The groove angle α_3' is equal to 0.0839. The sum of the tip angles of all the tip zones for a pair of screw elements according to the invention amounts to 8*0.0839=0.6712 and thus only approx. 0.211 times the sum of the tip angles of a pair of screw elements with a double-flighted Erdmenger screw profile.

Figure 15B:
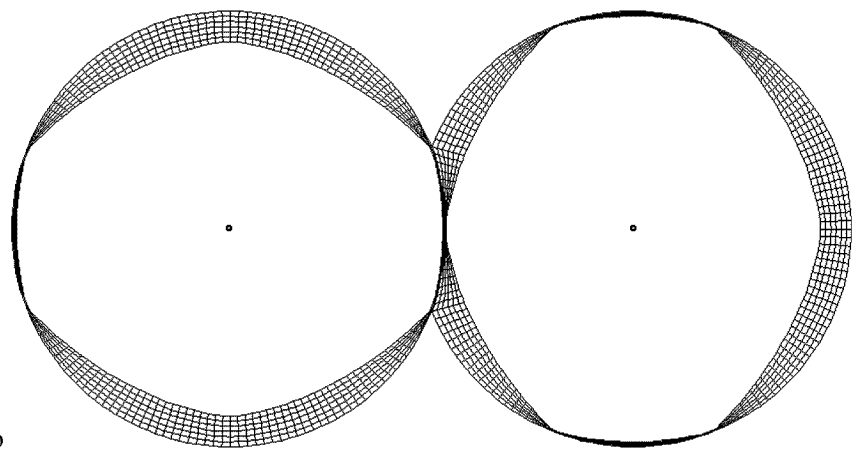

FIG. 15b shows a pair of screw elements, configured as conveying elements, whose screw profile is based on FIG. 15a. The clearance between the two conveying elements amounts to S=0.008. The clearance between the two conveying elements and the barrel amounts to D=0.004. The pitch of the conveying elements amounts to T=1.08. The length of the conveying elements amounts to 0.54, which corresponds to rotation of the screw profiles about an angle of π. The barrel is illustrated by thin, continuous lines to the left and right of the two conveying elements. A possible computational grid is further illustrated on the surfaces of the two conveying elements, which grid may be used for calculating flow in twin- and multi-screw extruders. The number of grid elements is equal to 160 in the circumferential direction and equal to 80 in the axial direction.

Figure 15C:
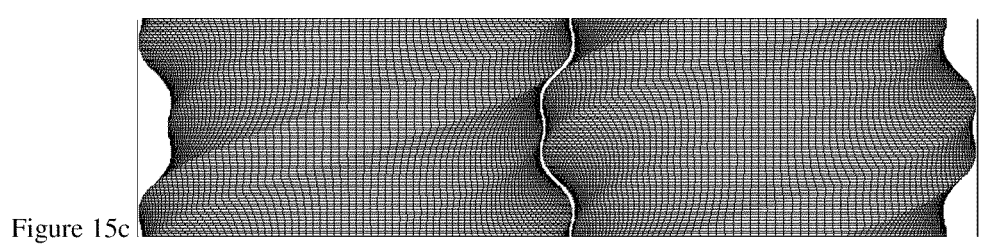

FIG. 15c shows a plan view of the pair of screw elements according to FIG. 15b. The free volume between the conveying elements and the barrel is provided with a possible computational grid, which may be used for calculating flow in twin- and multi-screw extruders. The number of grid elements is equal to 160 in the circumferential direction and equal to 6 in the radial direction. The axes of rotation of the two screw elements are labelled by small circles.

In contrast to the computational grids shown in FIGS. 15b and 15c, a computational grid is used for flow simulation which in each direction comprises twice as many computational cells, i.e. 320 grid elements in the circumferential direction, 160 grid elements in the axial direction and 12 grid elements in the radial direction.

The axial portions were calculated as follows: A1=0.1324, A2=18721, B1=0.3436, B2=6434. Maximum efficiency during pressure build-up is determined as 12.11%. Inherent throughput A1 and pressure build-up capacity A2 correspond to within approx. 1% or 2% with the results of Example 1. The values for the turbine point B1 and the power requirement B2 are approx. 20% smaller compared with Example 1. The result for the screw elements according to the invention compared with the screw elements according to the prior art is an improvement in pressure build-up efficiency of approx. 26.2%.

With the screw elements according to the invention, screw elements are provided which are more efficient than screw elements according to the prior art. At the same time, as a result of their reduced tip zone, the screw elements according to the invention expose the product to less thermal stress than do screw elements according to the prior art.

The invention claimed is:

1. Screw elements for multi-screw extruders with screws co-rotating in pairs and being fully self-wiping in pairs, the screw elements comprising
   a pair of screw elements having tip angles and tip zones,
   wherein a first screw element of the pair of screw elements comprises a generating screw profile and a second screw element of the pair of screw elements comprises a generated screw profile, and wherein the generating screw profile and the generated screw profile are convex profiles consisting of arcs having non-infinite radiuses,
   wherein the tip zones are equal to an outer screw radius,
   wherein a sum of all the tip angles of the pair of screw elements is greater than 0 and less than $2*\pi-8*\arccos(0.5*a/ra)$, and further
   wherein a is the centreline distance of the first and second screw elements and ra is the outer screw radius of the first and second screw elements,
   the number of tip zones of the pair of screw elements is greater than 4,
   each screw element of the pair of screw elements comprises exactly two screw profile closing zones, consisting, in each case, of the sequence tip zone, flank zone, tip zone,
   each screw element of the pair of screw elements comprises exactly two screw profile channel zones, consisting, in each case, of flank zones and grooved zones, and, in each case, beginning with a flank zone and ending with a flank zone, and in which the sum of the flank and groove angles of each channel zone is in each case greater than $\pi/2$, and
   the grooved zones are equal to a core radius and the flank zones are smaller than the outer screw radius and larger than the core radius.

2. The screw elements according to claim 1, wherein, after a rotation of $\pi/2$, the generated screw profile of the second screw element is identical in shape and orientation to the generating screw profile of the first screw element.

3. The screw elements according to claim 1, wherein, after a rotation of $\pi/2$, the generated screw profile of the second screw element is different in shape and orientation from the generating screw profile of the first screw element.

4. The screw elements according to claim 1, wherein the generating screw profile and the generated screw profile each comprise a sequence of channel zone-closing zone-channel zone-closing zone.

5. The screw elements according to claim 4, wherein a closing angle of at least one of the closing zones is greater than the 1.2 times a tip angle $\delta\_kw$ of a double-flighted Erdmenger screw profile, wherein the tip angle $\delta\_kw$ of a double-flighted Erdmenger screw profile with 2 flights is calculated as $\delta\_kw=\pi/z-2*\arccos(0.5*a/ra)$, wherein $\pi$ ($\pi\approx3.14159$) is the circle constant.

6. The screw elements according to claim 1, wherein the outer screw radius of the screw elements normalized to the centreline distance lies in the range from 0.51 to 0.66.

7. The screw elements according to claim 1, wherein the screw elements are configured as conveying elements or mixing elements by extending the screw profiles helically in the axial direction, or as kneading elements by extending the screw profiles in portions in an offset manner in axial direction.

8. The screw elements according to claim 1, further comprising clearances between at least one of (i) each screw element and a barrel and (ii) neighbouring screw elements.

9. The screw elements according to claim 1, wherein the number of tip zones of a pair of screw elements is equal to 8.

10. A method of using screw elements in multi-screw extruders, the method comprising:
    producing a pair of screw elements, having tip angles and tip zones, wherein the tip zones are equal to the outer screw radius, wherein a sum of all the tip angles of the pair of screw elements is greater than 0 and less than $2*\pi-8*\arccos(0.5*a/ra)$, and a total number of tip zones of the pair of screw elements is greater than 4, wherein each screw element of the pair of screw elements comprises exactly two screw profile closing zones, consisting, in each case, of the sequence tip zone, flank zone, tip zone, wherein each screw element of the pair of screw elements is provided with exactly two screw profile channel zones, consisting, in each case, of flank zones and grooved zones, and, in each case, beginning with a flank zone and ending with a flank zone, and in which a sum of the flank and groove angles of each channel zone is, in each case, greater than $\pi/2$, wherein the grooved zones are equal to a core radius and the flank zones are smaller than the outer screw radius and larger than the core radius, and wherein each screw element has a convex screw profile consisting of arcs having non-infinite radiuses; and
    providing a multi-screw extruder comprising the pair of screw elements, wherein the pair of screw elements are co-rotatable in pairs and fully self-wiping in pairs.

11. A process for extruding plastic compositions in multi-screw extruders having screw elements, the process comprising:
    providing a pair of screw elements in a multi-screw extruder, wherein the pair of screw elements are co-rotatable in pairs and fully self-wiping in pairs, wherein the pair of screw elements has a sum of all tip angles greater than 0 and less than $2*\pi-8*\arccos(0.5*a/ra)$, wherein a number of tip zones of the pair of screw elements is greater than 4, wherein the tip zones are equal to an outer screw radius, wherein each screw element of the pair of screw elements comprises exactly two screw profile closing zones, consisting, in each case, of the sequence tip zone, flank zone, tip zone, wherein each screw element of the pair of screw elements are provided with exactly two screw profile channel zones, consisting, in each case, of flank zones and grooved zones, and, in each case, beginning with a flank zone and ending with a flank zone, and in which a sum of the flank and groove angles of each channel zone is, in each case, greater than $\pi/2$, wherein the grooved zones are equal to a core radius and the flank zones are smaller than the outer screw radius and larger than the core radius, and wherein each screw element has a convex screw profile consisting of arcs having non-infinite radiuses; and extruding one or more plastic compositions in the multi-screw extruder using the pair of screw elements.

12. The process according to claim 11, wherein the one or more plastic compositions are thermoplastics or elastomers.

13. The process according to claim 12, wherein the thermoplastics used are polycarbonate, polyamide, polyester.

14. The process according to claim 12, wherein the thermoplastics used are polybutylene terephthalate and polyethylene terephthalate, polyether, thermoplastic polyurethane, polyacetal, fluoropolymer.

15. The process according to claim 12, wherein the thermoplastics used are polyvinylidene fluoride, polyether sulfones, polyolefin.

16. The process according to claim 12, wherein the thermoplastics used are polyethylene and polypropylene, polyimide, polyacrylate.

17. The process according to claim 12, wherein the thermoplastics used are one of poly(methyl)methacrylate, polyphenylene oxide, polyphenylene sulfide, polyether ketone, polyarylether ketone and styrene polymers.

18. The process according to claim 12, wherein the thermoplastics used are polystyrene or styrene copolymers.

19. The process according to claim 12, wherein the thermoplastics used are styrene-acrylonitrile copolymer, acrylonitrile-butadiene-styrene block copolymers, polyvinyl chloride or a blend of at least two of the stated thermoplastics.

20. The process according to claim 12, wherein the elastomers used are styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylenevinyl acetate rubber, polyurethane rubber, thermoplastic polyurethane, gutta percha, acrylate rubber, fluororubber, silicone rubber, sulfide rubber, chlorosulfonyl-polyethylene rubber or a combination of at least two of the stated elastomers.

21. The process according to claim 11, wherein filler or reinforcing materials or polymer additives or organic or inorganic pigments or mixtures thereof are added to the one or more plastics compositions.

* * * * *